(12) United States Patent
Staufenberg et al.

(10) Patent No.: US 10,729,242 B2
(45) Date of Patent: Aug. 4, 2020

(54) DRAWER

(71) Applicant: PAUL HETTICH GMBH & CO. KG, Kirchlengern (DE)

(72) Inventors: Gerrit Staufenberg, Osnabruck (DE); Sören Beumler, Bunde (DE); Stefan Mertins, Bunde (DE); Timo Szlapka, Bielefeld (DE)

(73) Assignee: PAUL HETTICH GMBH & CO. KG, Kirchlengern (DE)

( * ) Notice: Subject to any disclaimer, the term of this patent is extended or adjusted under 35 U.S.C. 154(b) by 0 days.

(21) Appl. No.: 16/463,453

(22) PCT Filed: Nov. 17, 2017

(86) PCT No.: PCT/EP2017/079642
§ 371 (c)(1),
(2) Date: May 23, 2019

(87) PCT Pub. No.: WO2018/095820
PCT Pub. Date: May 31, 2018

(65) Prior Publication Data
US 2019/0357678 A1 Nov. 28, 2019

(30) Foreign Application Priority Data

Nov. 25, 2016 (DE) .......................... 10 2016 122 824
Sep. 18, 2017 (DE) .......................... 10 2017 121 597

(51) Int. Cl.
*A47B 88/90* (2017.01)
*A47B 88/919* (2017.01)
(Continued)

(52) U.S. Cl.
CPC .......... *A47B 88/941* (2017.01); *A47B 88/919* (2017.01); *F16B 12/12* (2013.01); *F16B 12/28* (2013.01); *A47B 2220/0077* (2013.01)

(58) Field of Classification Search
CPC ..... A47B 88/941; A47B 88/944; A47B 88/95; A47B 88/951; A47B 88/919; F16B 12/12; F16B 12/18; F16B 12/28
See application file for complete search history.

(56) References Cited

U.S. PATENT DOCUMENTS 3,687,512 A * 8/1972 Alston ..................... F16B 12/24
312/348.2
4,440,460 A * 4/1984 Brighoff ................ A47B 95/02
16/415

(Continued)

FOREIGN PATENT DOCUMENTS

DE 202007002791 U1 6/2008
DE 202013011425 U1 3/2015
(Continued)

OTHER PUBLICATIONS

Search Report issued in Int'l App. No. PCT/EP2017/079642 (dated 2018).

(Continued)

*Primary Examiner* — Daniel J Rohrhoff
(74) *Attorney, Agent, or Firm* — Barnes & Thornburg LLP

(57) ABSTRACT

The invention relates to a drawer comprising two side panels, a bottom, a back wall and a front panel, wherein at least one side panel has a thin-walled case, which is supported by an inner core, wherein the inner core has at least two shaped parts, which are interlockingly held against each other.

40 Claims, 25 Drawing Sheets

(51) Int. Cl.
*F16B 12/12* (2006.01)
*F16B 12/28* (2006.01)

(56) References Cited

U.S. PATENT DOCUMENTS

| | | | | |
|---|---|---|---|---|
| 5,597,221 | A * | 1/1997 | Grieser | A47B 88/941 312/348.1 |
| 5,678,509 | A * | 10/1997 | Dillon | A01K 1/0107 119/165 |
| 6,053,593 | A * | 4/2000 | Rock | A47B 88/00 312/348.2 |
| 10,117,514 | B2 * | 11/2018 | Karu | A47B 88/941 |
| 2008/0161737 | A1 * | 7/2008 | Hilditch | A45D 34/04 601/135 |
| 2013/0181590 | A1 * | 7/2013 | Chen | A47B 88/941 312/330.1 |

FOREIGN PATENT DOCUMENTS

| | | |
|---|---|---|
| DE | 102014000822 | 7/2015 |
| DE | 202015102912 | 9/2016 |
| EP | 0865745 | 9/1998 |
| WO | WO 2008/028811 | 3/2008 |

OTHER PUBLICATIONS

Search Report issued in German App. No. 102017121597.2 (dated 2017).

* cited by examiner

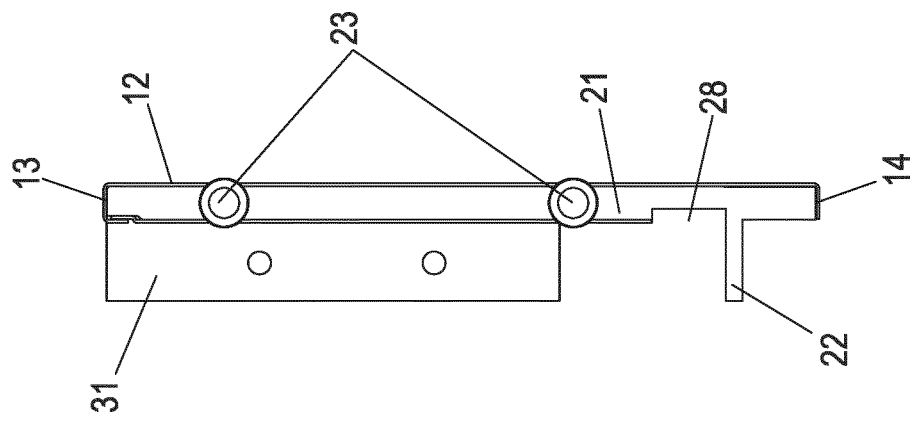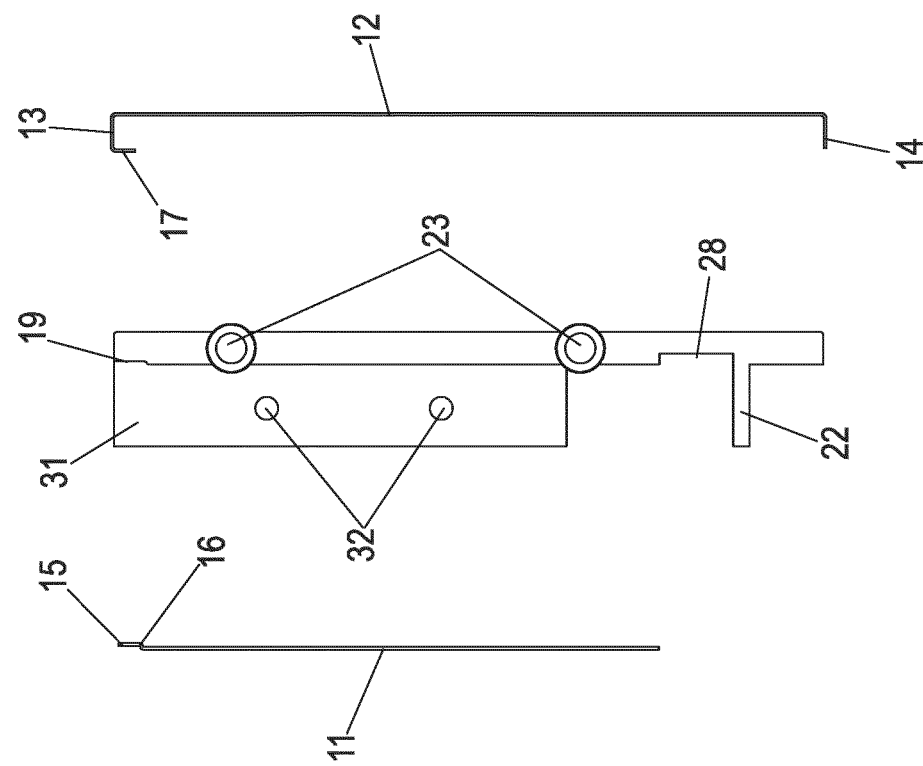

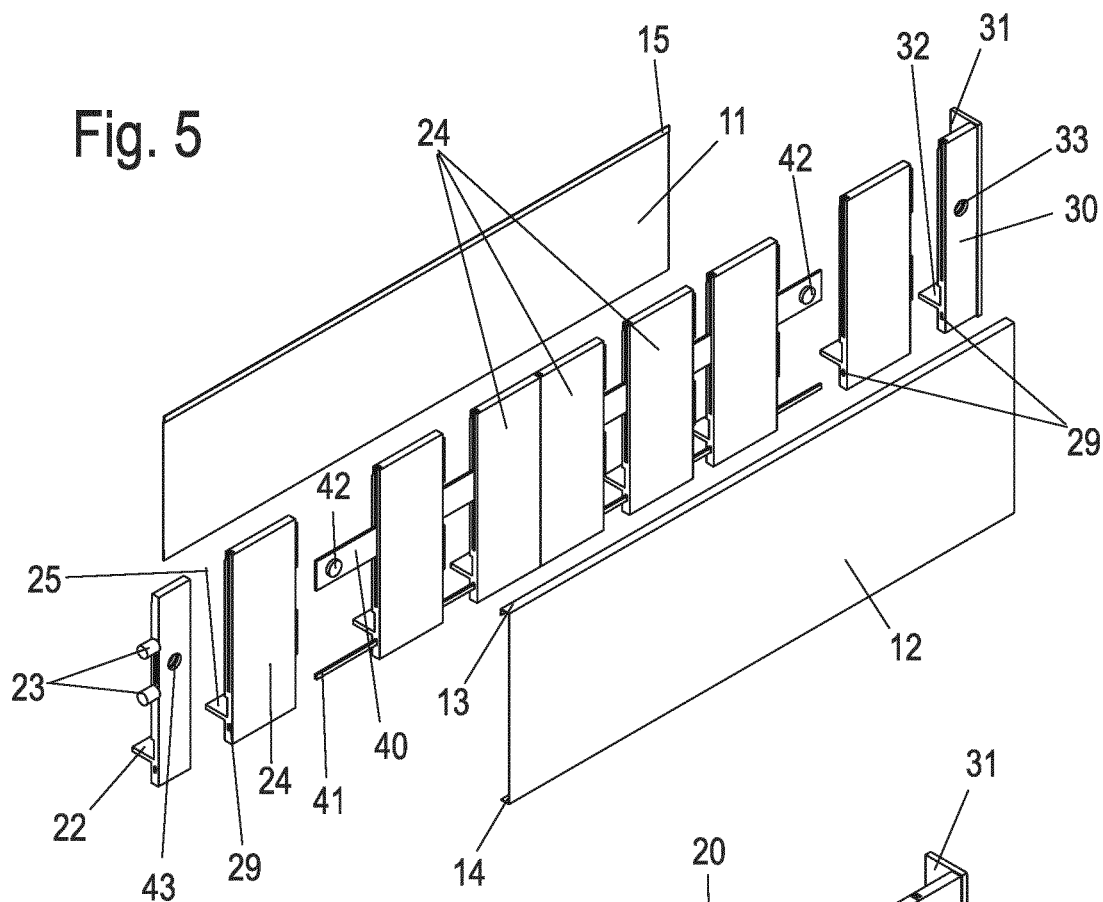
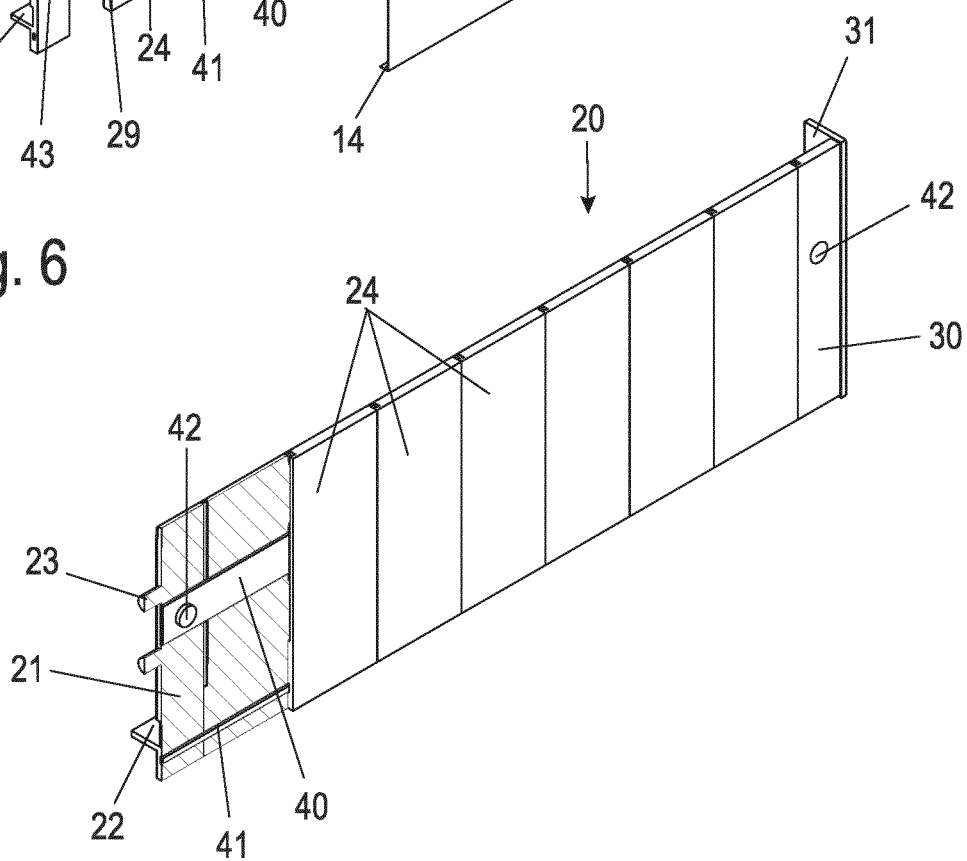

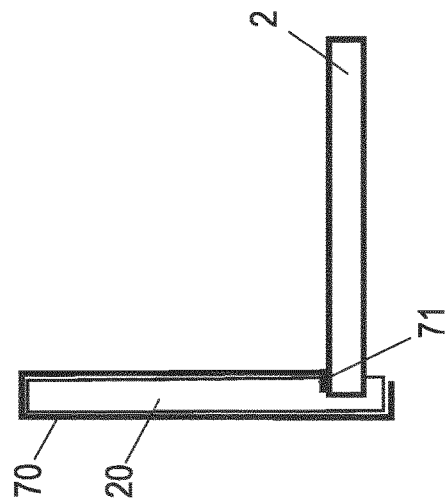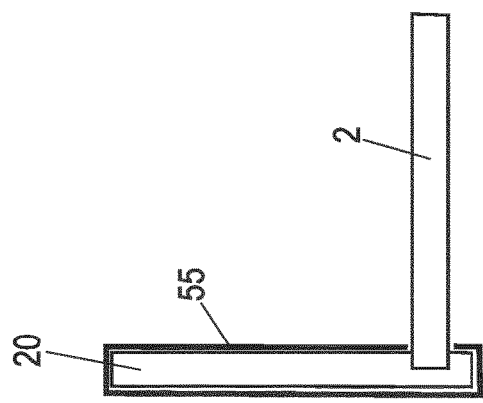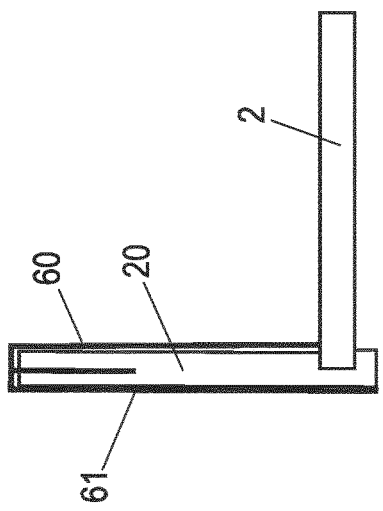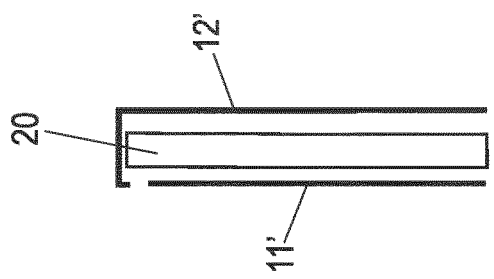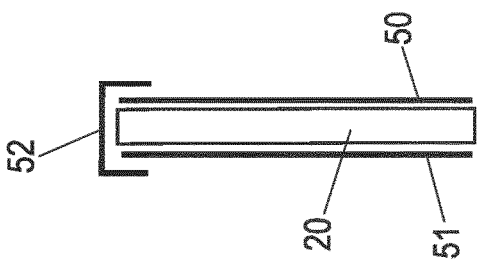

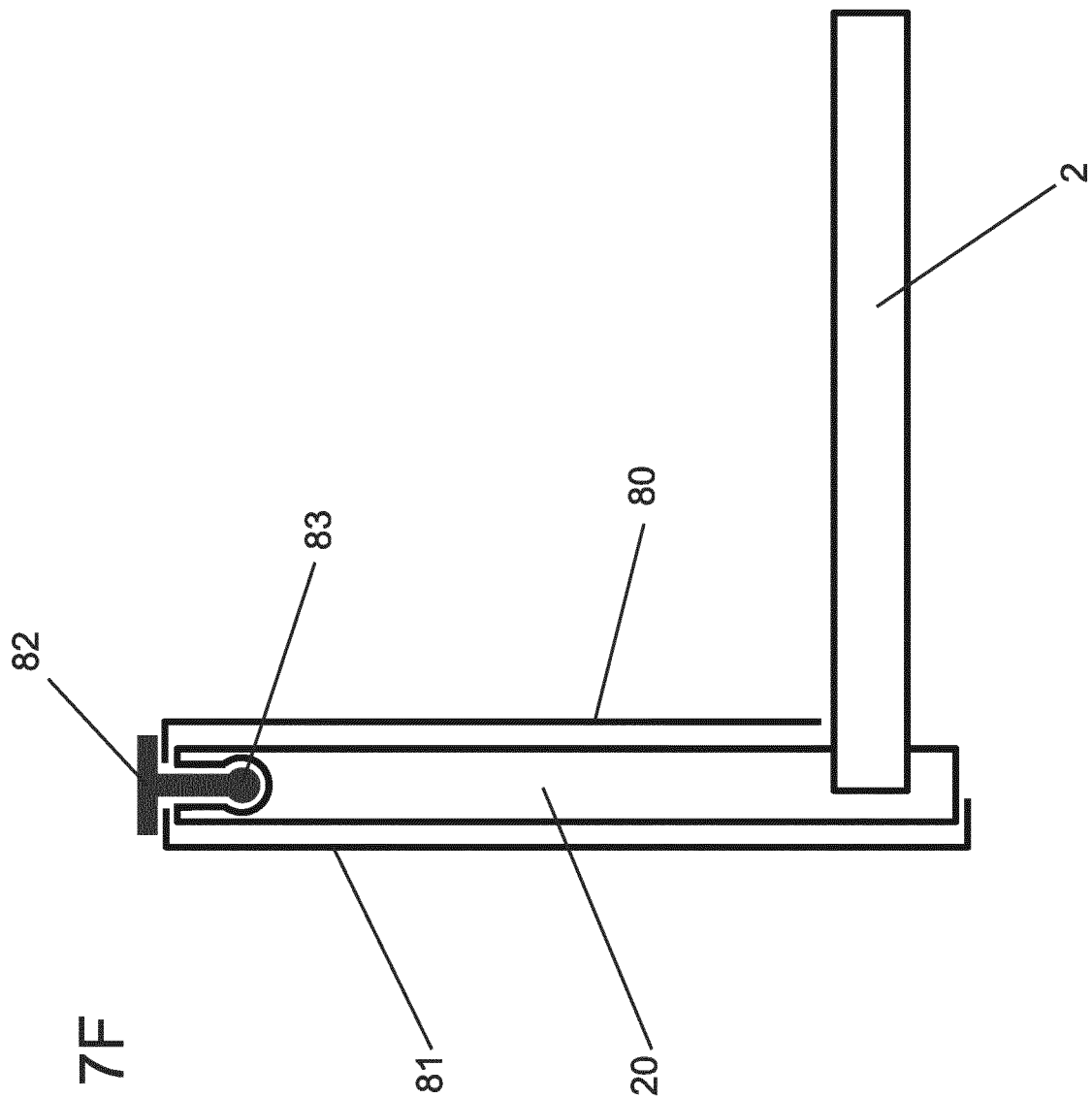

DRAWER

CROSS-REFERENCE TO RELATED APPLICATIONS

This application is a U.S. nationalization under 35 U.S.C. § 371 of International Application No. PCT/EP2017/079642, filed Nov. 17, 2017, which claims priority to German Patent Application No. 102016122824.9, filed Nov. 25, 2016 and German Patent Application No. 102017121597.2, filed Sep. 18, 2017. The disclosures set forth in the referenced applications are incorporated herein by reference in their entireties

BACKGROUND AND SUMMARY OF THE DISCLOSURE

The present present disclosure is directed to a drawer having two side frames, a bottom, a rear wall and a front panel, at least one of the side frames having a thin-walled casing supported by an inner core.

DE 10 2014 000 822 A1 discloses a method for manufacturing a drawer frame in which a plastic material is extruded and cut into a profile strand and then covered with a film. Extrusion can be used to reinforce the outer film, but it is difficult to fix the side frame produced in this way to a front panel or rear wall of a drawer. In addition, extrusion profiles can only be produced with the same cross-section, which limits the functionality of the design.

In a drawer according to the present disclosure, at least one side frame has a thin-walled casing supported by an inner core, wherein the inner core has at least two shaped parts which are held together in a form-fitting manner. The use of at least two shaped parts allows greater flexibility in the shaping of the core than in the extrusion process, thus facilitating the connection of the front panel and/or rear wall. In addition, the stable construction of the side frame can be realized by the form-fitting arrangement of at least two shaped parts.

In an embodiment, the inner core has at least three shaped parts, which are held together in a form-fitting manner. At least three different shaped parts can be provided, which need not be identical in construction.

The shaped parts may extend over the entire length of the casing so that the casing is well supported.

In an embodiment, a first shaped part is provided with fastening means for fixing the front panel. The front panel, for example, can have openings in which a pin is inserted. Other fastening means for the front panel, such as screw connections, can also be provided.

A second shaped part may have fastening means for the rear wall. The second shaped part can, for example, be angular in shape and form a contact surface for the rear wall with a web. One or more third shaped parts may then be provided between the first shaped part and the second shaped part, connecting the first shaped part to the second shaped part. The number of shaped parts can be freely selected to a large extent, depending on the length of the drawer. The shaped parts can be produced cost-effectively as injection-molded shaped parts, which can be plugged into one another, for example, via tongue-and-groove connections.

For a stable fixation of the casing it can be glued to the shaped parts. The shaped parts can be essentially plate-shaped and have a laterally protruding web as a support for the bottom. The casing does not have to be closed but can have an opening for the bottom, which engages in the casing at the edge.

The casing may be made of one or more metal sheets. Due to the support by the core, the thickness of the metal sheets can be less than 0.8 mm, for example, less than 0.5 mm.

The shaped parts may be made of plastic, wherein a dimensionally stable material, for example, metal or plastic, which is fixed to or in the shaped parts, may be provided for reinforcement. For a filigree structure, the entire side frame may have a thickness of less than 10 mm, in particular less than 8 mm. As an option, the casing can also contain individual elements made of other materials, such as wood, in order to be visually appealing.

The casing can be installed without welding, for example, only by gluing the bent metal sheets. By filling the casing with a core, the side frame forms a smaller sound body than a hollow profile, so that noises when the drawer is moved are also dampened.

The functionality of the side frame can be improved according to an embodiment if the inner core is formed with shaped parts from different heights in vertical alignment to the longitudinal direction of the side frame. The free spaces resulting from the different heights of the shaped parts in the inner core can, for example, be filled by at least one wall element made of glass or another visually appealing material, such as colored, transparent or translucent glass, wood or natural stone. Optionally, it is also possible to provide a light guide or lighting means, for example LED, on or in the shaped parts of the side frame.

In a further embodiment, at least one shaped part has a groove to accommodate a bottom of the drawer. For a stable fixing of the bottom, a holder with a claw made of metallic material for fixing the bottom can be provided in the groove. The bottom can then be fixed non-positively by pushing it into the groove, wherein the claw may dig itself into the bottom at an underside of the bottom.

In a further embodiment, a shaped part arranged at the end, which is arranged adjacent to the front panel or the rear wall, comprises a receptacle into which a fastening element for fixing the front panel or the rear wall is inserted. The fastening element can be slidably or pivotably mounted relative to the shaped part via an adjustment mechanism so that the front panel or the rear wall can be aligned by adjusting the fastening element. The adjustment mechanism can be used for depth adjustment or tilt adjustment as well as for height or lateral adjustment. The insertion of the fastening element can be dependent on the installation situation so that a different functionality is obtained with one and the same shaped part depending on the use of a fastening element.

BRIEF DESCRIPTION OF THE DRAWINGS

FIGS. 3A and 3B show two front views of the side frame of FIG. 2;

FIG. 5 shows a perspective exploded view of a second embodiment of a side frame according to the present disclosure;

FIG. 6 shows a view of the core of the side frame of FIG. 5;

FIGS. 7A to 7F show several schematic views of side frames according to the present disclosure with a different casing;

DETAILED DESCRIPTION OF THE DRAWINGS

Figure 1:
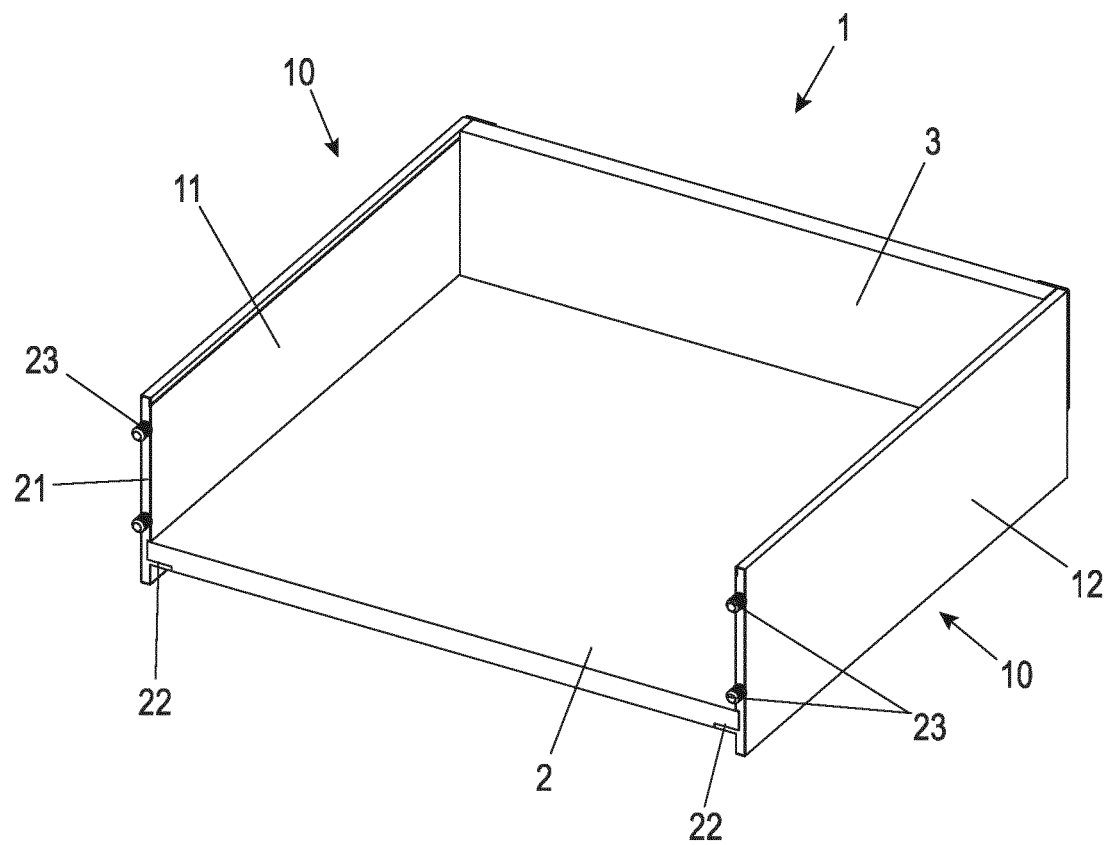
FIG. 1 shows a perspective view of a drawer according to the present disclosure.

A drawer 1, for example, for a piece of furniture or a household appliance, comprises a bottom 2 from which a rear wall 3 projects on the rear side, which is connected on opposite sides to two side frames 10. The side frames 10 connect the rear wall 3 to a panel-shaped front panel, which is not shown and which covers a front side of drawer 1. The front panel is fixed to pins 23, which protrude from the side frames 10, which can be inserted into corresponding openings on the front panel and optionally glued.

Figure 2:
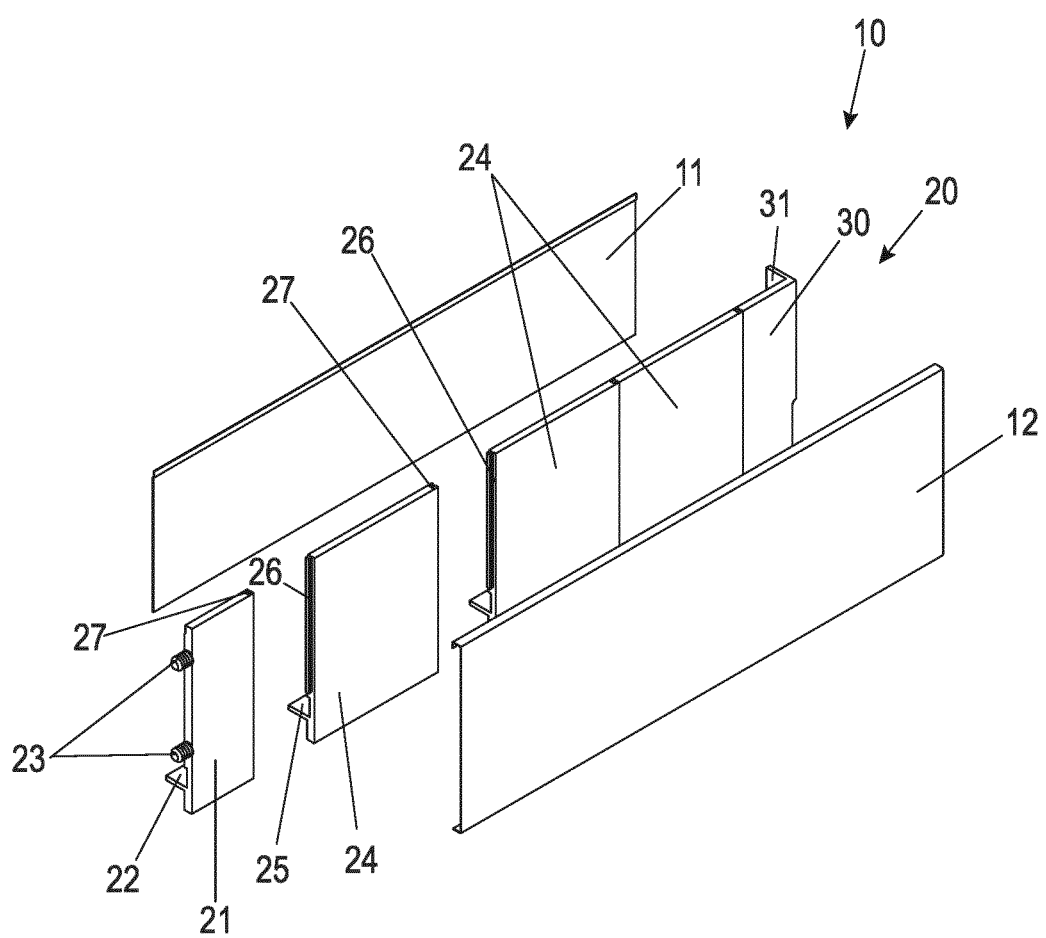
FIG. 2 shows an exploded view of a side frame of the drawer in FIG. 1.

The design of a side frame 10 is shown in detail in FIG. 2, wherein the opposite side frame 10 is mirror-inverted and has the same structure. Each side frame 10 comprises a casing made of two metal sheets 11 and 12 surrounding an internal cavity filled by a core 20. The core 20 is formed from several shaped parts 21, 24 and 30, which are held together in a form-fitting manner.

A first shaped part 21 is used to fix the front panel and comprises two protruding pins 23 on one end face. The shaped part 21 is essentially plate-shaped and has an inwardly projecting web 22 to support the bottom 2. A groove 27 is formed on the side opposite the pins 23, in which a web-shaped tongue 26 of an adjacent shaped part 24 engages. The shaped part 24 also has an inwardly directed web 25 for supporting bottom 2.

A further shaped part 30 is provided on the rear side, which is angular in shape and has a web 31, which is aligned parallel to the plane of the rear wall 3. The web 31 embraces the rear wall 3 and can be connected to it, for example, via screws. The shaped part 30 has a further section which is aligned with the adjacent parts 24. Between the front shaped part 21 and the rear shaped part 30 there are several middle shaped parts 24 with the same shape, for example between two and eight shaped parts, depending on the length of the side frame 10.

In FIGS. 3A and 3B, the side frame of FIG. 2 is shown in a front view. The casing comprises a first thin-walled metal sheet 11 and a second thin-walled metal sheet 12, which may have a thickness of less than 0.8 mm, for example, less than 0.5 mm, for example between 0.3 mm and 0.5 mm. The metal sheet 12 has an upper edge 13 connected to a downwardly angled web 17 so that a U-shaped upper edge is bent. In the lower area, the otherwise plate-shaped metal sheet 12 is provided with a bend 14. The metal sheet 11 is essentially plate-shaped and comprises a step 16 in the upper part, followed by a web 15 which extends parallel to the metal sheet 11.

The side frame 10 can be assembled by first assembling the core 20 and then gluing the metal sheet 12 to the core 20. Furthermore, metal sheet 11 is inserted into the space between web 17 and a wall of core 20, and metal sheet 11 is also glued to core 20. The unit formed in this way can then be combined with the rear wall 3, the front panel and the bottom 2 to form a drawer. For mounting the rear wall, openings 32 are cut out in the web 31, into which screws can be screwed.

For bottom 2, a groove-shaped receptacle 28 is formed on the shaped parts 21, 24 and 30 next to the webs 22, into which a side edge of bottom 2 can be inserted so that it is also secured against lifting. As can be seen in particular in FIG. 3B, the casing with metal sheets 11 and 12 does not completely surround the core 20, but a partial area for the bottom 2 and an area below the webs 22 is not clad, as this is usually not visible.

Figure 4:
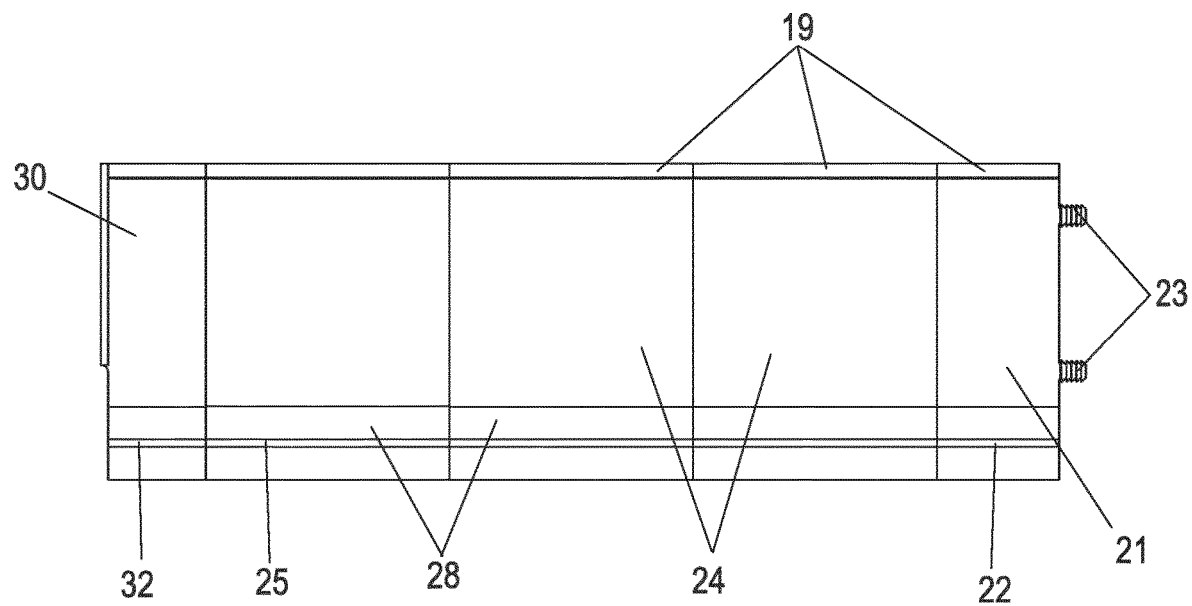
FIG. 4 shows a view of the core of the side frame of FIG. 2.

FIG. 4 shows a composite core consisting of shaped parts 21, 24 and 30. The shaped parts 21, 24 and 30 form a recess 19 at an upper edge, into which the upper web 15 with step 16 of the metal sheet 11 can be inserted so that the metal sheet 11 is also attached in a form-fitting manner to the core 20.

FIG. 5 shows another embodiment example of a side frame designed similar to FIG. 2. However, shaped parts 21, 24 and 30 have one or more passages for reinforcing elements 40 and 41. A first band- or strip-shaped reinforcing element 40, for example made of a steel sheet or a hard plastic, passes through the middle shaped parts 24 and has at each end a projection 42 or a recess with a pin or bolt inserted therein, which can be inserted into an opening 43 of the front shaped parts 21 and an opening 33 of the rear shaped parts 30. The band-shaped reinforcing element 40 can be used to increase the lateral stability and the load-bearing capacity of the core in tension. In addition, a rod-shaped reinforcing element 41 is passed through openings 29 in the shaped parts 21, 24 and 30 in the lower area, which is glued, for example, in the openings 29. Other mechanical fixings for the reinforcing part 41 can also be provided.

FIG. 6 shows the composite core 20 with the reinforcing elements 40 and 41, which contribute to the stabilization of the interconnected shaped parts 21, 24 and 30. In all other respects, this embodiment example is designed in the same way as the first embodiment example.

FIGS. 7A to 7F show different variants for a casing of a core 20, which is only schematically shown and can be designed as shown in FIG. 2 or 5.

FIG. 7A shows a plate-shaped metal sheet 11' glued to the core 20 and a second metal sheet 12' bent into a U-shape in the upper region and also glued to the core 20. Step 16 was omitted for the metal sheet and bend 14 for the metal sheet.

In the example shown in FIG. 7B, the casing is made up of three parts, namely two plate-shaped metal sheets 50 and 51, the upper part of which is covered by a U-shaped profile 52, the two legs of which overlap the outer walls of the metal sheets 50 and 51.

FIG. 7C shows a variant in which the core 20 is covered by an integral casing 55 which is bent according to the core, leaving out a recess for bottom 2 to pass through.

In FIG. 7D, the casing is formed by two metal sheets 60 and 61, which are plate-shaped on the inside and outside and bent into a U-shape in the upper region, with a groove-shaped receptacle in the core 20 engaging in the connecting region of the legs. This can increase the stability of the unit consisting of the casing and core 20, especially if the legs engaging in the core 20 are also glued to the core 20.

In an embodiment example shown in FIG. 7E, the casing 70 is again formed in one piece, similar to FIG. 7C, but above the drawer there is a bend 71 which rests on the bottom 2 so that no gap is visible between the top of the bottom 2 and the casing.

FIG. 7F shows an example of a casing with an inner wall 80 and an outer wall 81 made of angled metal sheets surrounding a core 20. For fixing the inner wall 80 and the outer wall 81 to the core 20, a plug-in part 82 is provided, which can be inserted into a receptacle on the core 20 using a latching element 83, in particular a pin with a latching head. The plug-in part 82 can be used to fix the inner wall and the outer wall 81 in the manner of a welt. For this purpose, the inner wall 80 and the outer wall 81 can at least partially engage with an end section in the receptacle on the core 20 and be fixed in a form-fitting or force-locking manner by the plug-in part 82.

The embodiment examples shown can be combined as required. For example, the core 20 may have only one reinforcing element 40 or 41 or more than the shown reinforcing elements 40 and 41. The reinforcement does not have to extend through the shaped parts, but may also be fixed to a surface of the shaped parts, for example by gluing.

The shaped parts 21, 24 and 30 are positively held together by tongue-and-groove connections. Of course, it is also possible to provide other form-fitting connections, for example dovetail connections, hook connections or other plug-in or pivot connections.

The shaped parts 21, 24 and 30 are made of plastic by an injection-molding process. Depending on the length of the side frames, more or less medium-sized shaped parts 24 can be inserted between shaped part 21 and rear shaped part 30.

Figure 8A:
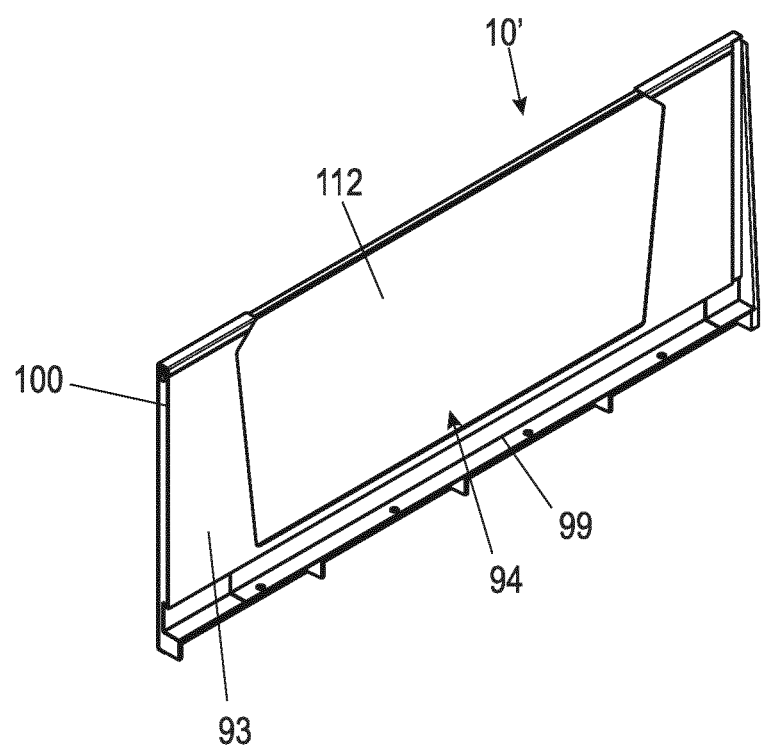
FIGS. 8A to 8C show several views of another embodiment of a side frame according to the present disclosure.
Figure 8B:
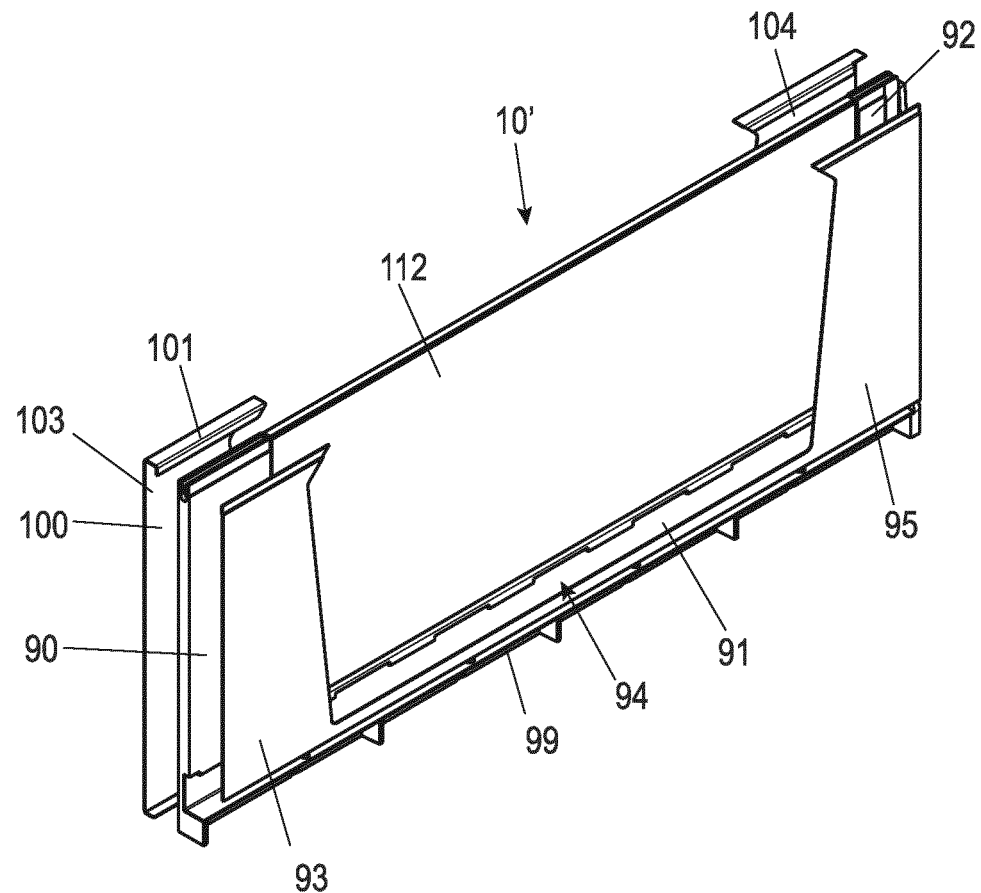
Figure 8C:
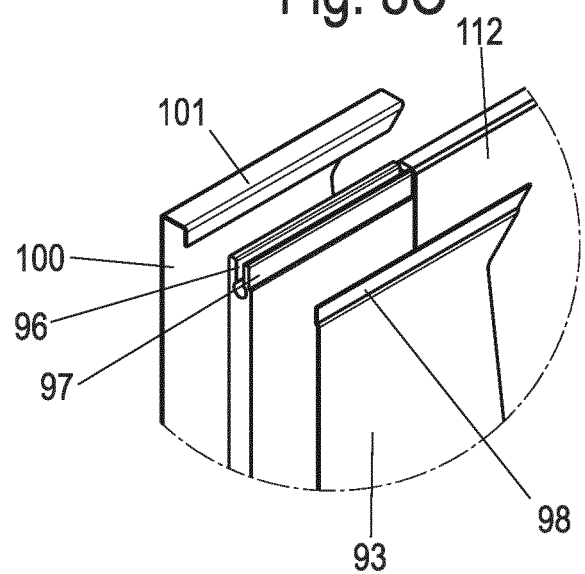

FIGS. 8A to 8C show another embodiment example of a side frame 10' having a front shaped part 90, a middle shaped part 91 and a rear shaped part 92. The middle shaped part 91 has a lower height in the vertical longitudinal direction of the side frame than the shaped parts 90 and 92. A wall element made of glass or another optically appealing material is placed on the middle shaped part and remains visible from the outside. For this purpose, an inner casing is provided on the inside of the side frame, comprising a front web 93 and a rear web 95, between which a recess 94 is formed in which the glass wall element remains visible. The front shaped part 90 and the rear shaped part 92 are connected by the central shaped part 91, which has a groove for accommodating a bottom for the drawer. The web 93 covers the front shaped part 90 and protrudes above it in the longitudinal direction of the frame, so that the glass wall element is partially covered by the web 93 and the rear web 95 and thus the wall element 112 is held in the vertical direction relative to the longitudinal direction of the side frame. Similarly, an outer casing 100 is provided on the outside of the frame with two webs 103 and 104, which are optionally also connected to the webs 93 and 95, wherein a U-shaped edge 101 is integrally formed on the front web 103, which engages over an upper side of the shaped part 90. In addition, an end section of the wall element 112 is overlapped so that the wall element 91 is held by the casings. The front shaped part 90 and the rear shaped part 92 are arranged in one plane with the glass wall element and form almost flat contact surfaces in the direction of the inner and outer casing.

On the shaped parts 90 and 92, a groove 96 is formed on one upper side, which can be used for the assembly of further components, e.g. cover strips or top frames. In the embodiment example of FIGS. 8 and 9, however, the groove 96 is not occupied.

Figure 9A:
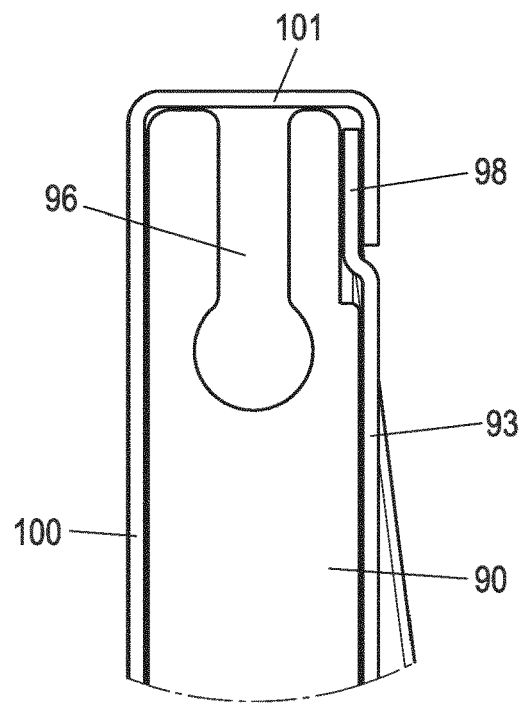
FIGS. 9A and 9B show two views of the side frame of FIG. 8 during assembly.
Figure 9B:
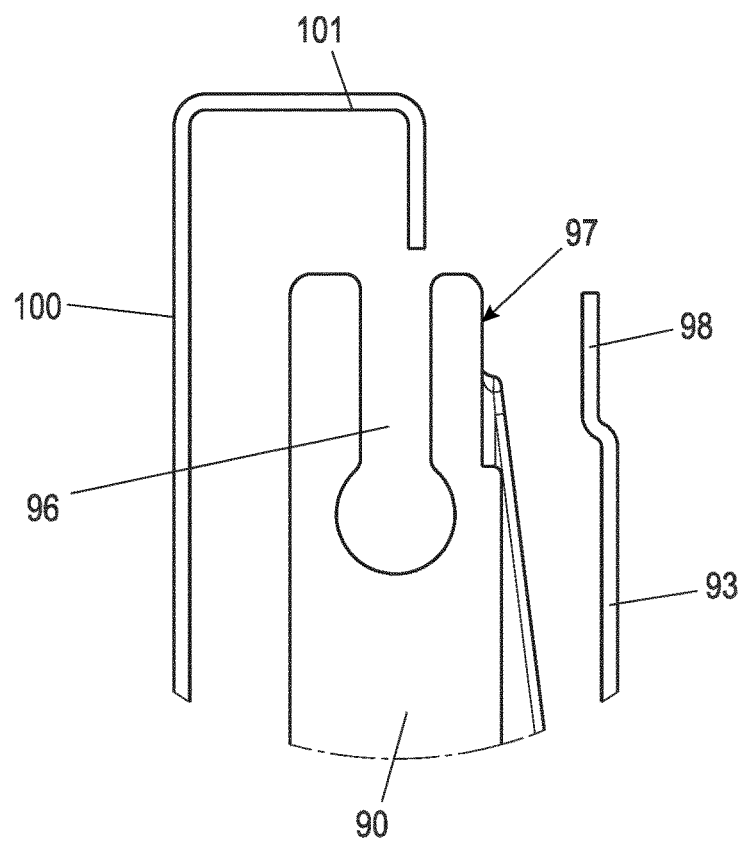

As shown in FIGS. 9A and 9B, the shaped part 90 is provided for assembly before the inner casing is fitted with the web 93 and the outer casing 100 is fitted with the U-shaped edge 101. A step-shaped edge 98 is formed on the web 93, which engages in a corresponding receptacle 97 on the shaped part 90 so that the inner casing with the web 93 is held in a form-fitting manner on the shaped part 90. The stepped edge 98 is then covered by the U-shaped edge 101 of the outer casing 100, wherein the casings can optionally be glued together.

Figure 10A:
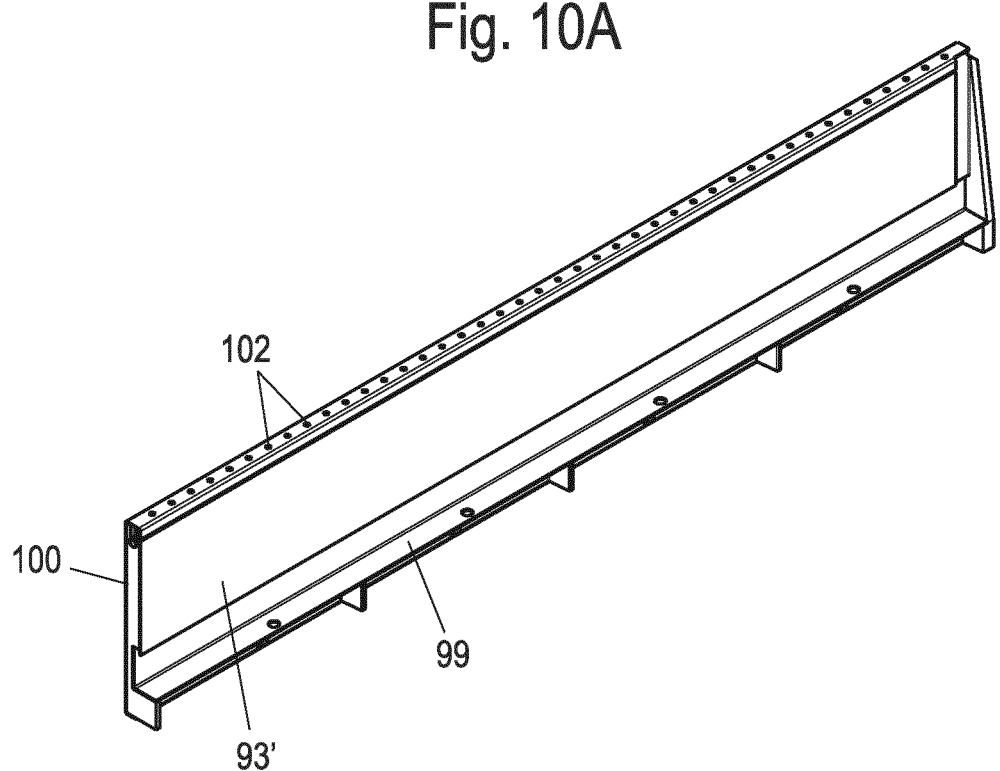
FIGS. 10A and 10B show two views of another embodiment of a modified side frame according to the present disclosure.
Figure 10B:
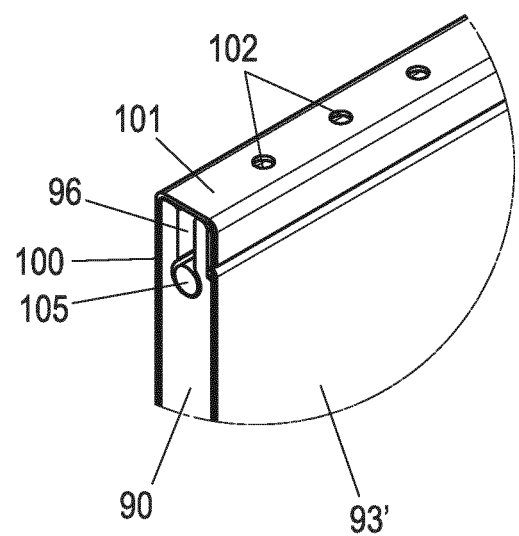

FIGS. 10A and 10B show a modified embodiment example of a side frame in which an inner casing 93' has no recess 94 and several shaped parts 90 are provided in the interior, as explained above. On the outside, an outer casing 100 is provided, which with a U-shaped edge 101 engages around the shaped parts 90 on an upper side. In the shaped parts 90, there is a groove 96 into which a light guide 105 is inserted. Light is emitted into the light guide 105, for example via an LED arranged in the side frame, rear wall or front panel. In the U-shaped edge 101, several openings 102 are recessed, so that light can be emitted via the light guide 105 through the openings 102, resulting in an optically appealing effect.

Figure 11A:
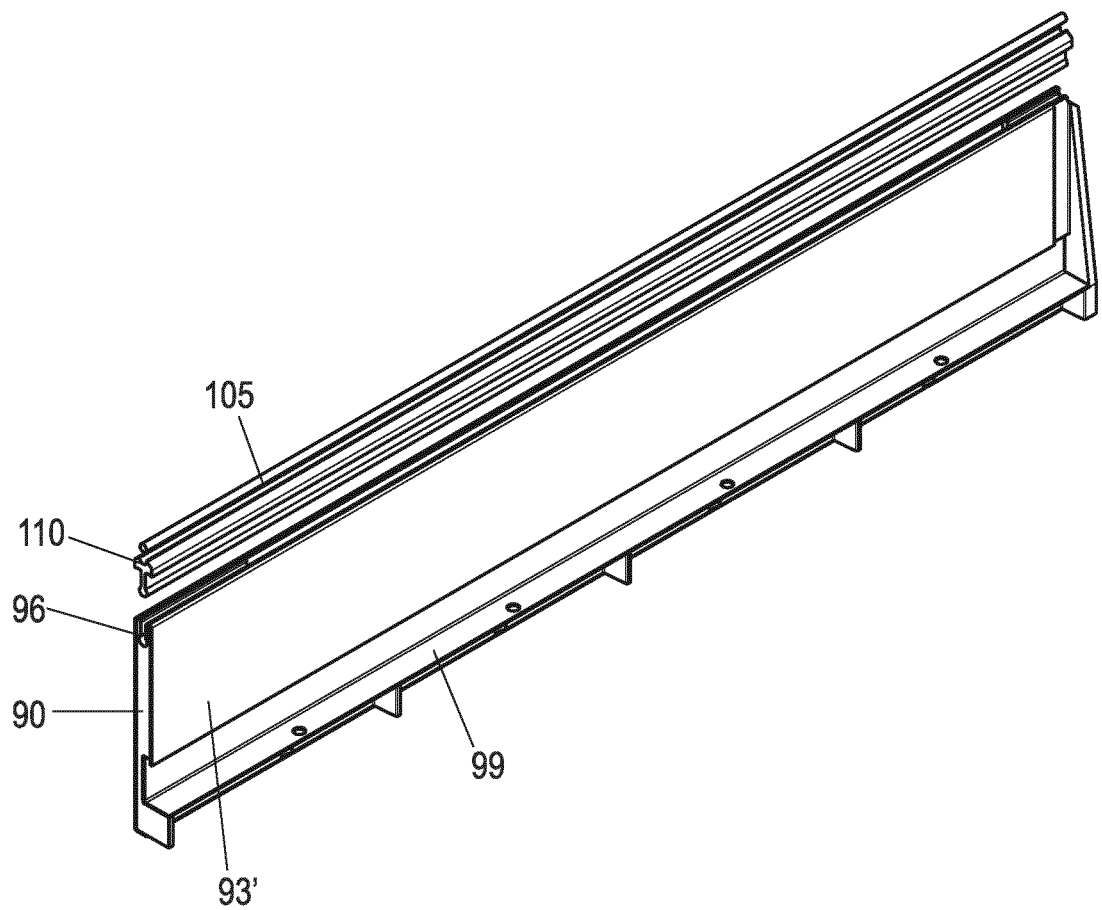
FIGS. 11A and 11B show two views of a modified side frame according to the present disclosure.
Figure 11B:
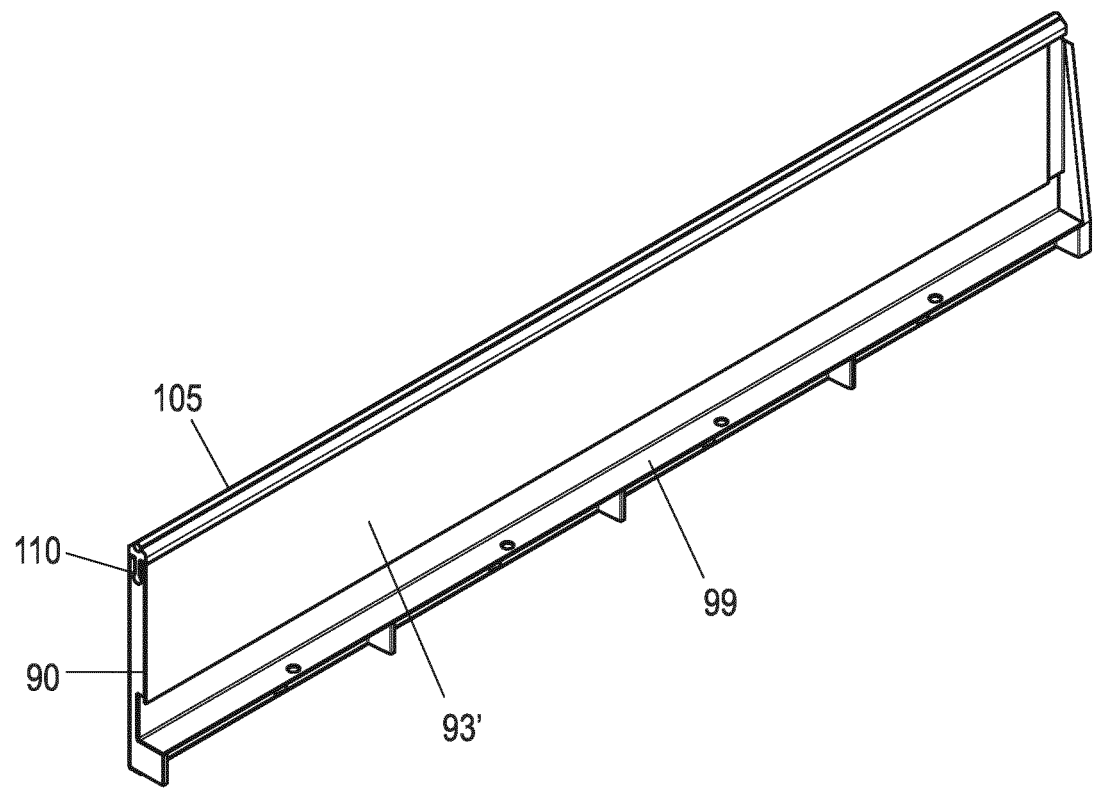

FIGS. 11A and 11B show an embodiment example modified from FIG. 10, in which a plug-in part 110 is inserted into groove 96 on fittings 90, with a light guide 105 being arranged on the upper side thereof. The rod-shaped light guide 105 remains visible from the outside after installation and can be used to distribute light that is radiated into one end of the light guide 105. The inner casing 93' extends to just below the light guide 105, and the outer casing also does not cover the light guide 105.

Figure 12A:
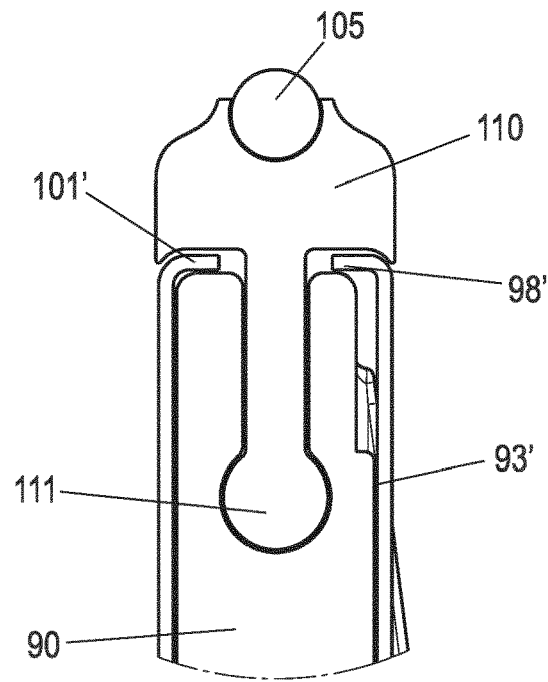
FIGS. 12A and 12B show two detailed views of the side frame of FIG. 11B.
Figure 12B:
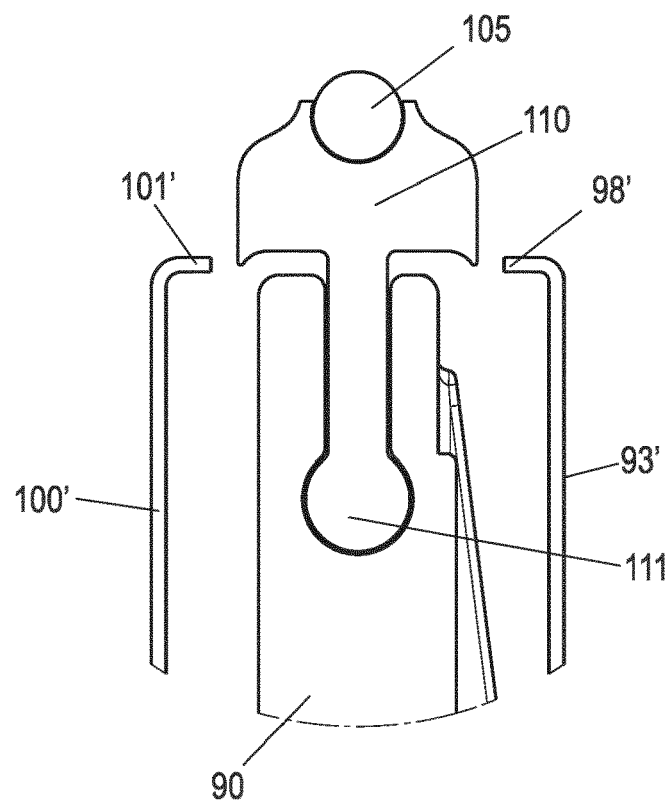

As shown in FIGS. 12A and 12B, the inner casing 93' may have a curved edge 98' on the top and the outer casing may have a curved edge 101 inserted between a top of the shaped part and a thickened head portion of the plug-in part 110. Thus, the casings 93' and 100' can be held in position by means of the plug-in part 110. The plug-in part 110 has a thickened foot section 111, which is inserted into a corresponding widening of the groove 96. The light guide 105 is fixed to the upper side of the plug-in part 110, in particular glued or clamped.

Figure 13A:
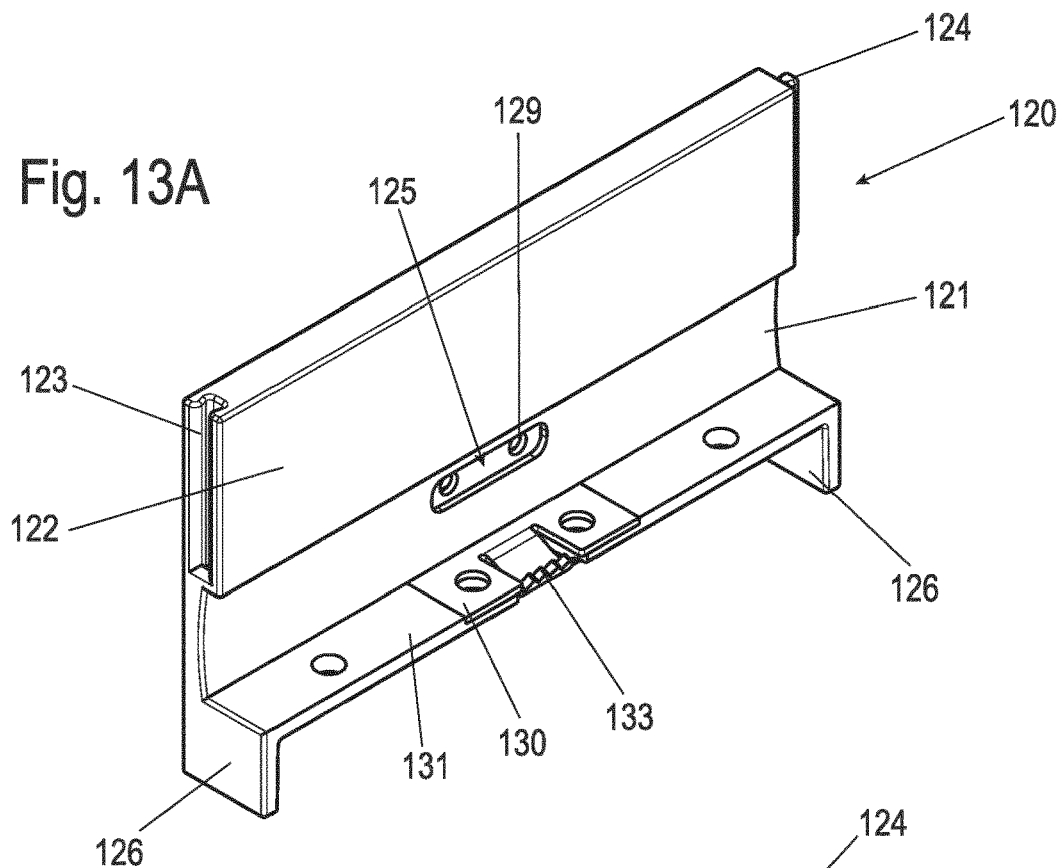
FIGS. 13A and 13B show two views of a modified shaped part for a side frame according to the present disclosure.
Figure 13B:
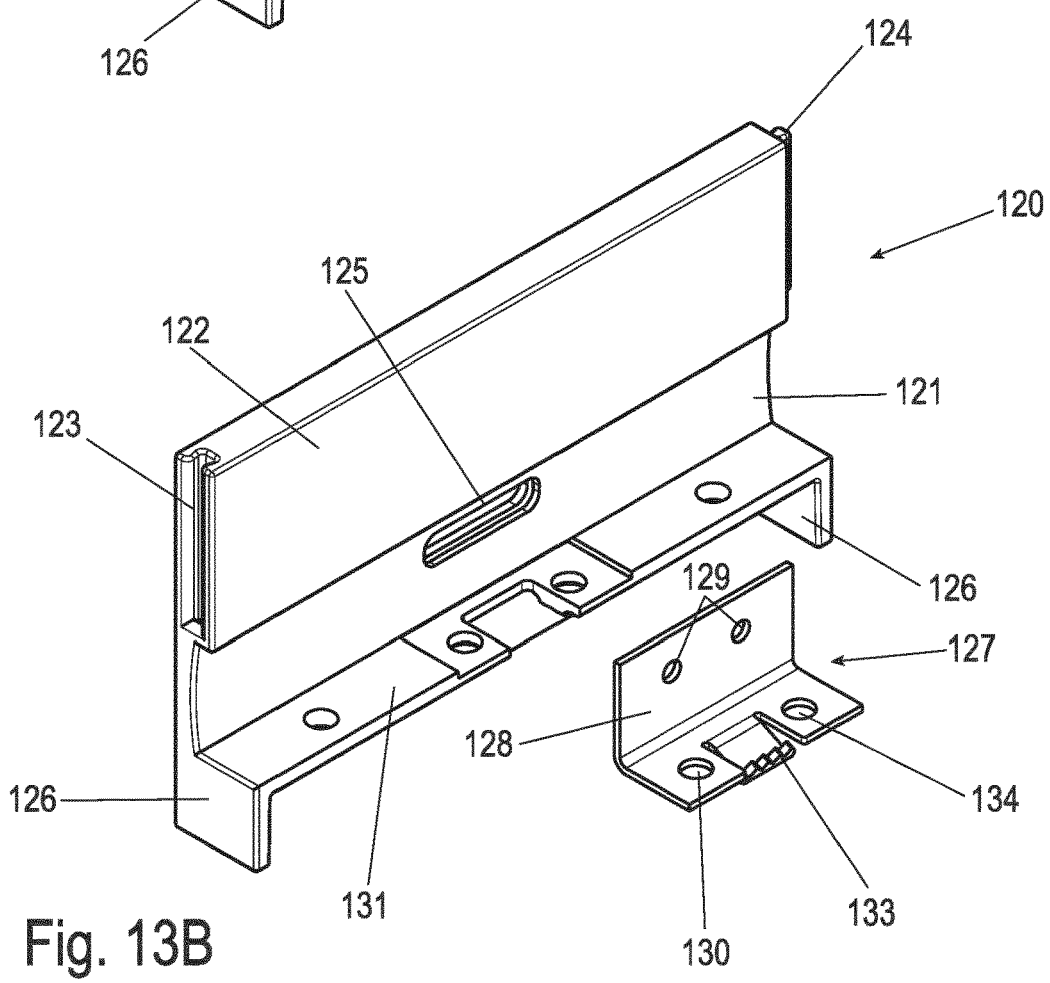

FIGS. 13A and 13B show a modified plastic shaped part for a side frame, wherein the metallic casing was omitted. The side frame comprises at least one shaped part 120 with a groove 121 to accommodate a bottom of the drawer. in an embodiment, the shaped parts 120 extend over the entire length of the side frame. A wall element 122 is provided above the groove, which has a groove 123 on one end face in the longitudinal direction of the side frame, into which a protruding tongue 124 of an adjacent shaped part 120 can be inserted. This means that several shaped parts 120 can be inserted into one another over the entire length of a side frame.

An opening 125 is provided in a bottom of the groove 121 to fix a metal bracket 127. The metal bracket 127 includes a vertical leg 128 with mounting holes 129 arranged in the mounted position within the opening 125. On a lower horizontal leg 131 of the groove 121, a receptacle is formed into which a second leg 130 of the metal bracket 127 is inserted. On the second leg 130 there is a claw 133 with teeth projecting upwards, which is surrounded by two webs with mounting openings 134. To fix a bottom of the drawer, it can be pushed into the groove at the edge and fixed in a force-locking manner, wherein the claw 133 buries itself into the bottom at an underside of the bottom. The clamping forces on the claw 133 are then distributed over the horizontal leg 131, which can be supported at opposite ends by downward projecting webs 126. The upper side of the second leg 130 and the upper side of the horizontal leg 131 can essentially be aligned flush to support the floor.

Figure 14:
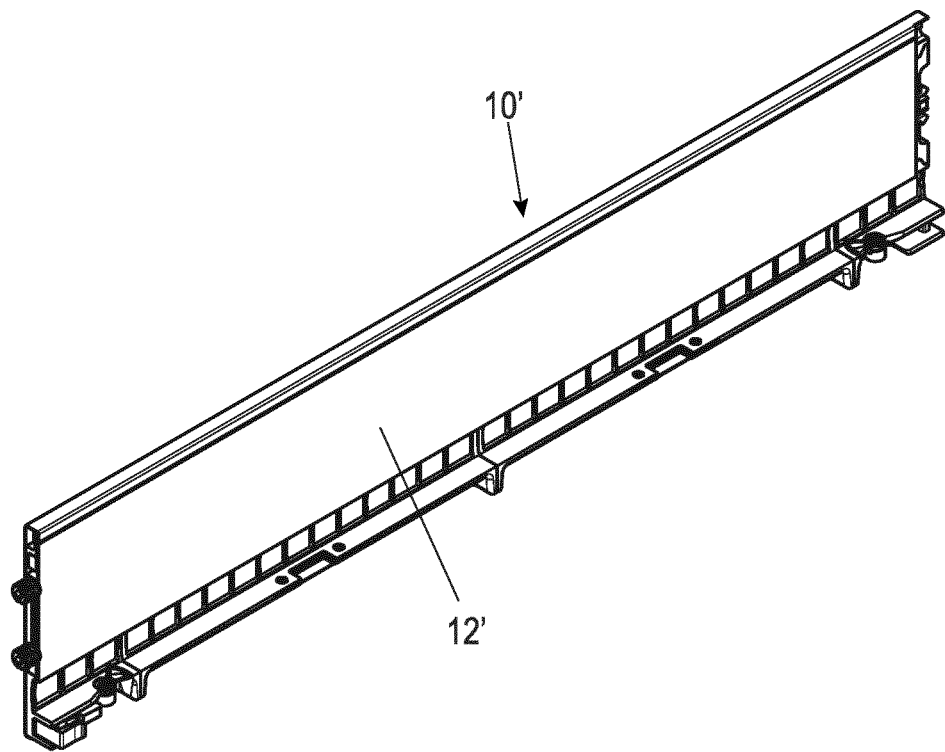
FIG. 14 shows a perspective view of a modified side frame of a drawer according to the present disclosure.
Figure 15:
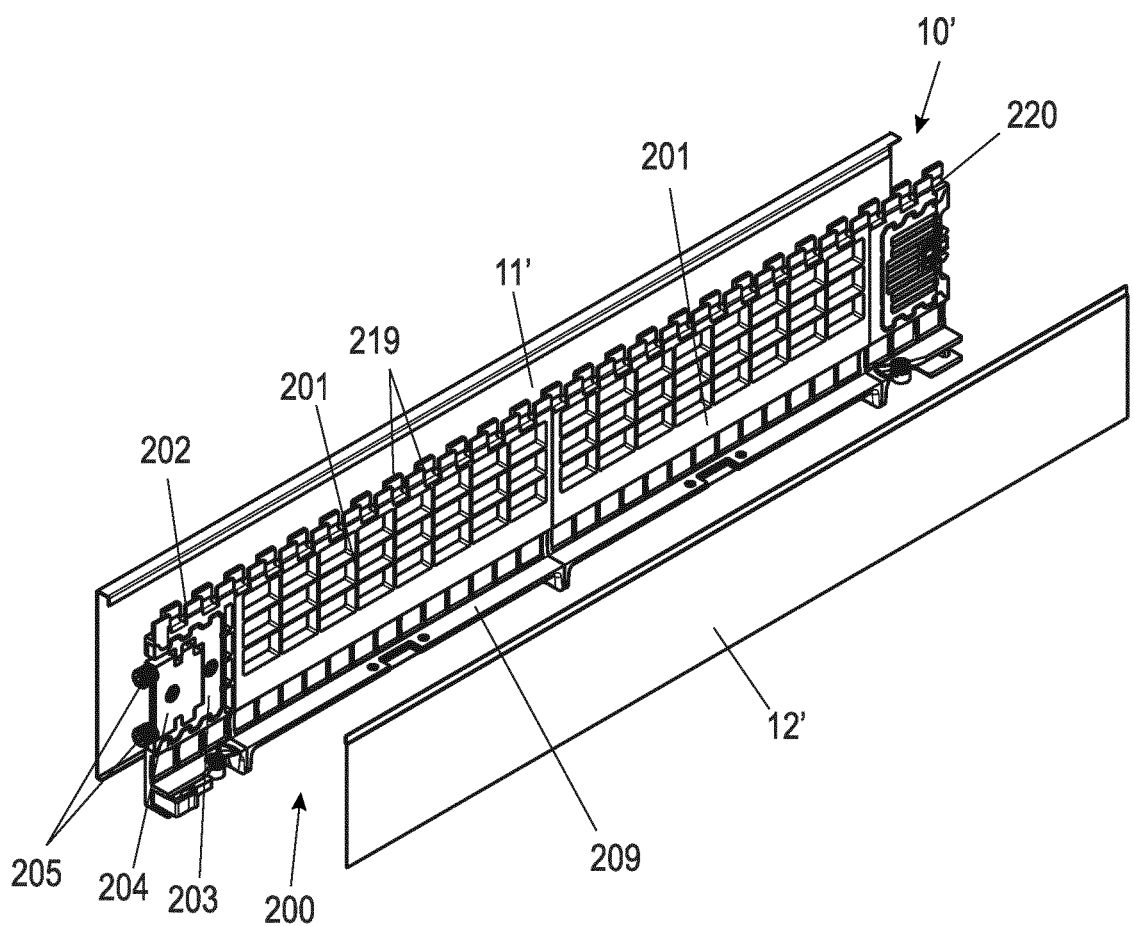
FIG. 15 shows an exploded view of the side frame of FIG. 14.
Figure 16:
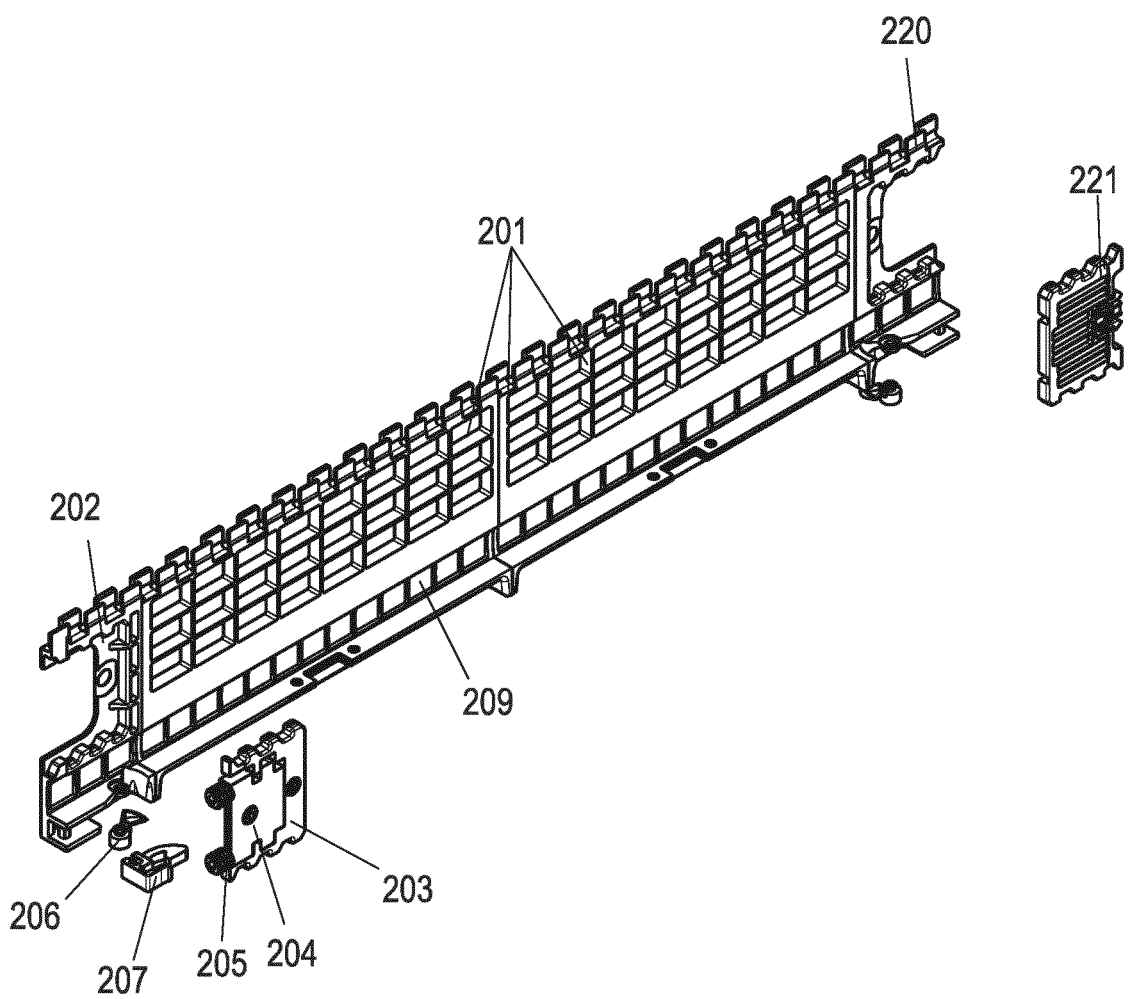
FIG. 16 shows a perspective exploded view of the side frame of FIG. 15 without casing.

FIGS. 14 and 15 show a modified side frame 10' for a drawer 1. The side frame 10' comprises a casing made of two bent metal sheets 11' and 12' and surrounding an inner core comprising one or more middle shaped parts 201, a shaped part 202 at the end facing the front panel and a shaped part 220 at the end facing the rear wall. The middle shaped parts 201 can be made of plastic by an injection-molding process and have a grid structure so that only little material is needed in relation to the volume of the shaped part 201. A groove 209 is formed under the sheet metal 12' on shaped parts 201, 202 and 220 for inserting an edge of a bottom of the drawer. On the shaped parts 201, 202 and 220, there are a large number of upwardly projecting webs 219 on one upper side, to which the two metal sheets 11' and 12' of the casing can be attached, wherein the type of attachment can also be designed in accordance with one of the previous embodiment examples.

The shaped part 202 facing the front panel is provided with a recess or receptacle, into which a fastening element 203 is inserted. The fastening element 203 is surrounded by the shaped part 202 on at least three sides, in an embodiment, on at least four sides. The fastening element 203 comprises an adjustment element 204, which is adjustable relative to the fastening element 203. Fastening means 205 are provided on the adjustment element 204 for fixing the front panel, wherein the fastening means 205 in the embodiment example shown are designed as pins which are inserted into corresponding holes or openings on the front panel.

In addition, a height adjustment is provided on the shaped part 202, wherein a mounting part 207 can be fixed in the lower region of the shaped part 202, on which a curve guide is formed, which cooperates with a lever 206, which can adjust the position of the front panel relative to the bottom during a rotary movement.

The shaped part 202 arranged adjacent to the front panel can have the same design as a shaped part arranged on the opposite side frame facing the rear wall. The shaped part 220 facing the rear wall on the same side frame is symmetrically mirrored to a central plane perpendicular to the longitudinal direction of the side frame. A modified fastening element 221 is inserted into the receptacle on the shaped part 220, which is essentially held in a form-fitting manner on the shaped part 220 and serves to fix the side frame to the rear wall.

Figure 17:
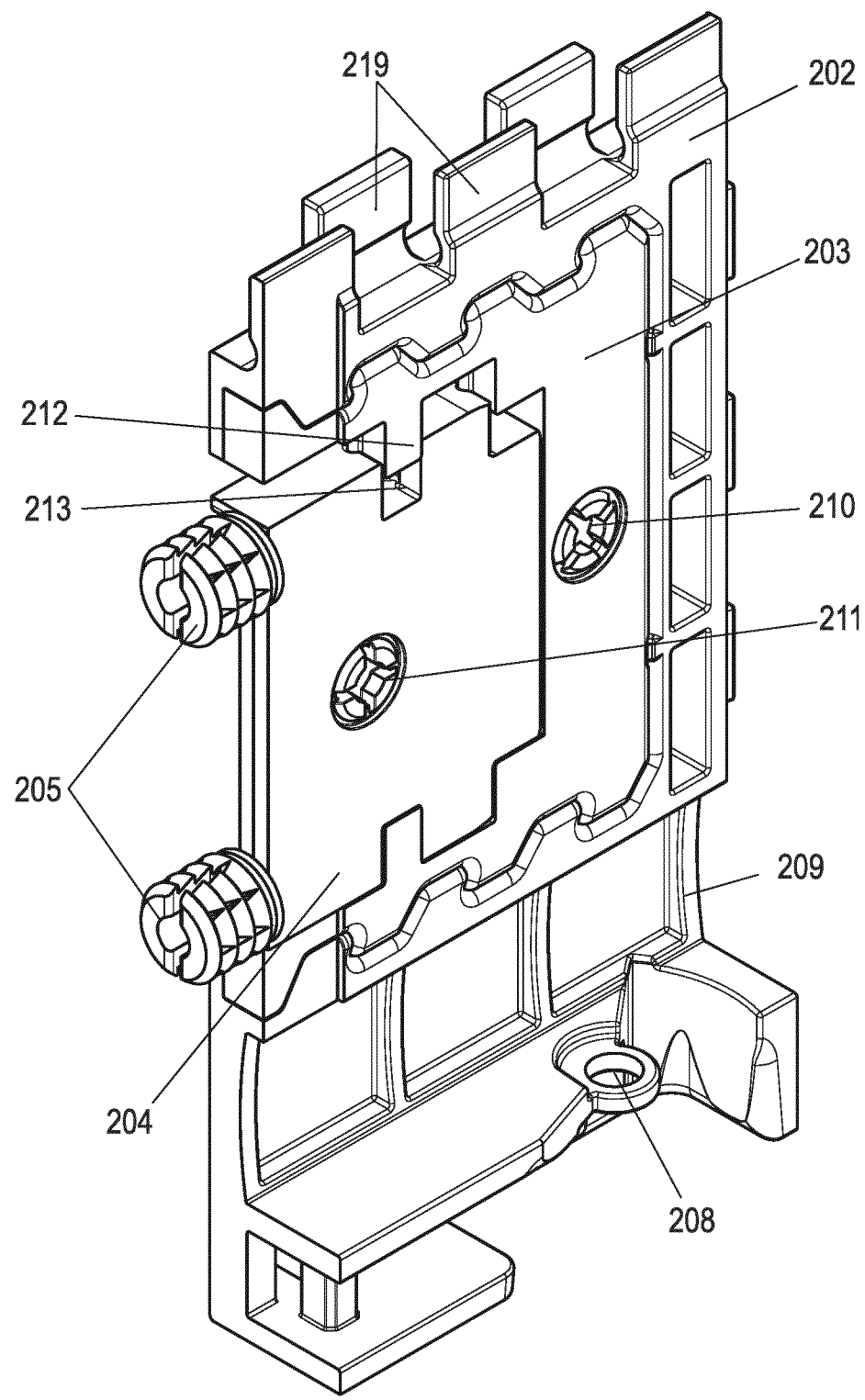
FIG. 17 shows a detailed view of the shaped part adjacent to the front panel with a fastening element.
Figure 18:
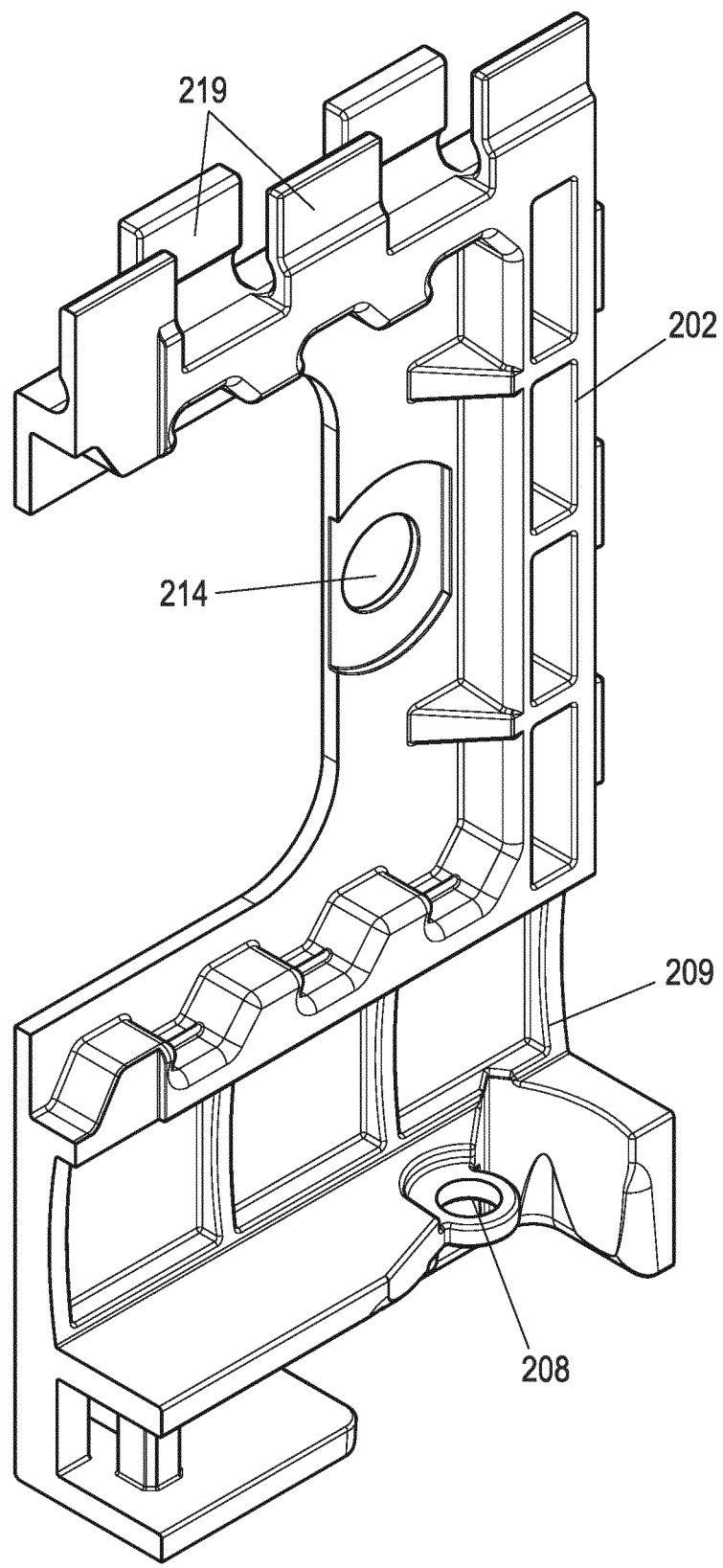
FIG. 18 shows a perspective view of the shaped part of FIG. 17 without the fastening element.

FIG. 17 shows in detail the shaped part 202 adjacent to the front panel with the fastening element 203. On the fastening element 203 there is a rotatable eccentric 210, which is rotatably mounted in an opening 214 on a wall section of the shaped part 202 (FIG. 18). The height of the adjustment element 204 can be adjusted relative to the fastening element 203 using the eccentric 210. For this purpose, the adjustment element 204 is accommodated with vertical play within the fastening element 203, wherein one or more webs 212 are formed on the fastening element 203 for guidance, which engage in corresponding recesses 213 or guide receptacles.

A lateral adjustment 211 is also provided on the fastening element 203 which is arranged on the adjustment element 204. The lateral adjustment 211 can be used to change the position of the adjustment element 204 in one direction horizontally and perpendicular to the longitudinal direction of the side frame.

There is also a groove 209 on the shaped part 202 to accommodate an edge of the bottom of the drawer, wherein the position of the bottom can be changed by means of a height adjustment. The height adjustment with the lever 206 is rotatably mounted on an eye 208.

FIG. 18 shows the shaped part 202 without the fastening element 203, and it can be seen that the fastening element 203 is enclosed in a U-shaped manner and rests at least partially against a wall section on a fourth side.

Figure 19:
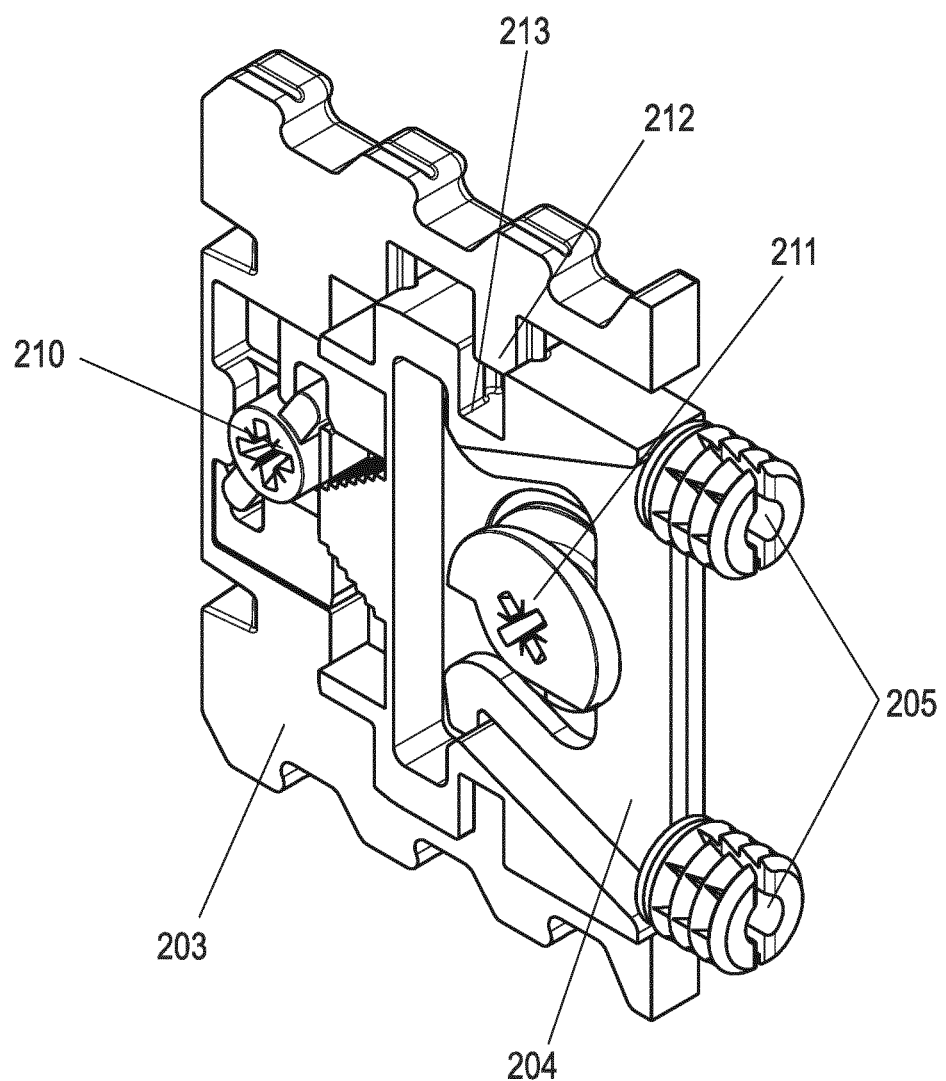
FIG. 19 shows a perspective view of the fastening element of FIG. 17.

FIG. 19 shows the fastening element 203, and the eccentric 210 can be seen, by means of which the adjustment element 204 can be adjusted in height relative to the fastening element 203. In addition, the lateral adjustment 211 can be seen, which enables the adjustment element 204 to be positioned in a direction perpendicular to the plane of the side frame. On the adjustment element 204, two pins are formed as fastening means 205 for fixing the front panel.

Figure 20:
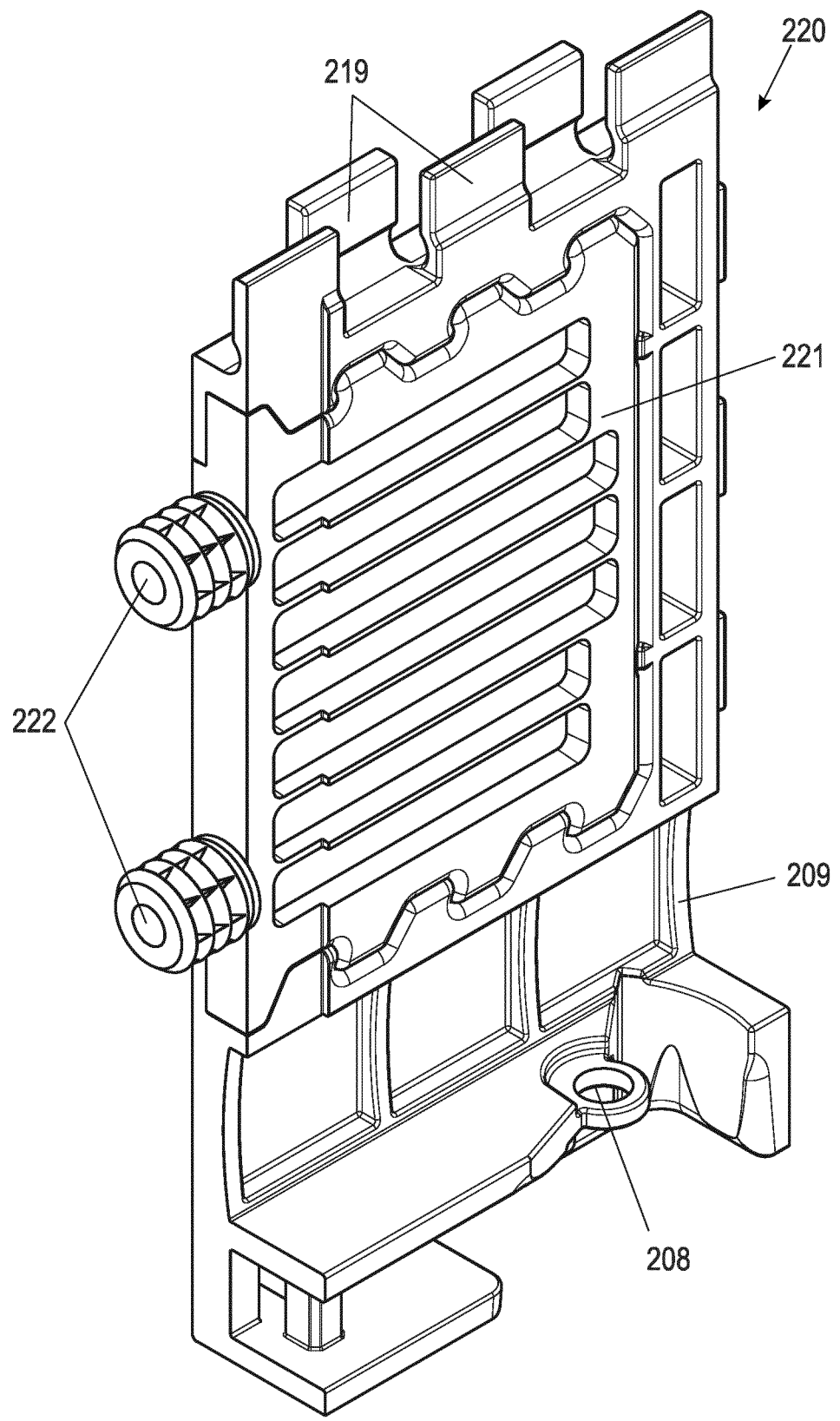
FIG. 20 shows a perspective view of the shaped part with a modified fastening element according to the present disclosure.

FIG. 20 shows the rear shaped part 220, which has webs 219 at the upper edge and has a receptacle or recess which is designed as in the front shaped part 202 and is only open to the rear. A fastening element 221 is inserted into the receptacle as a shaped part, which is held in a form-fitting manner and immovably on the shaped part 220. Two pins 222 are integrally formed on the fastening element 221, which serve to fix a rear wall. The shaped part 220 also includes a groove to accommodate the edge of the floor and an eyelet 208 for mounting a height adjustment.

Figure 21:
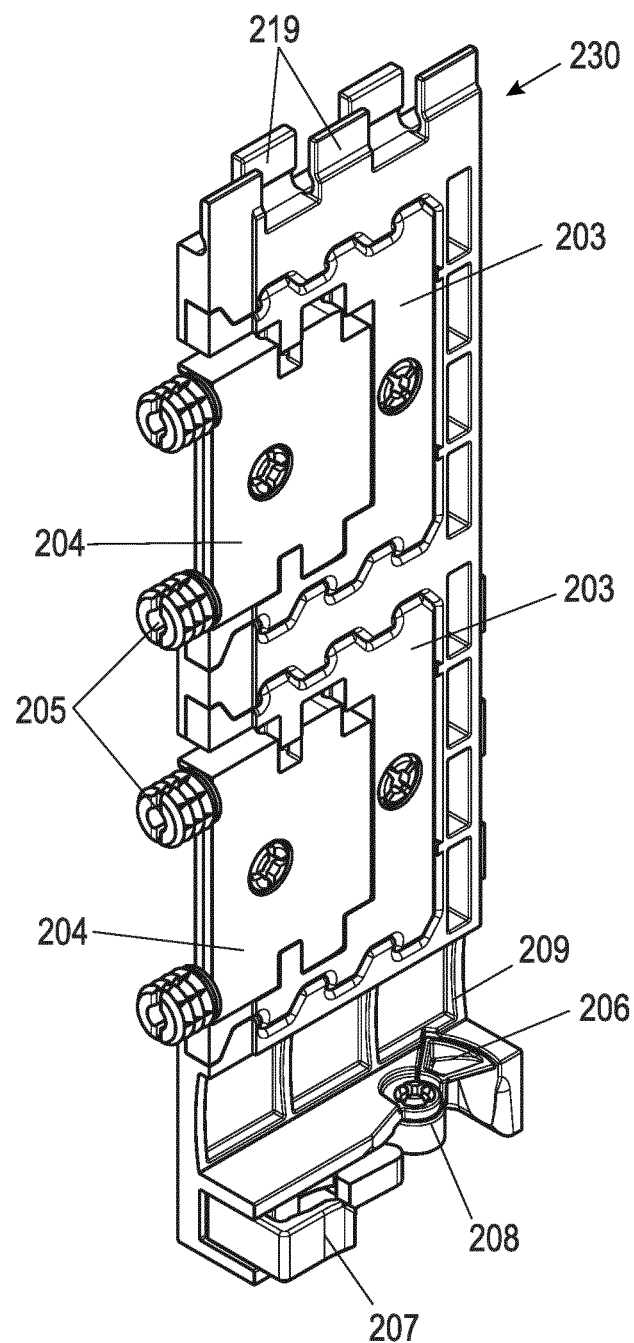
FIG. 21 shows a perspective view of a modified shaped part with two fastening elements according to the present disclosure.

FIG. 21 shows a modified shaped part 230 which is designed higher than the shaped parts 202 and 220 described above, wherein two receptacles or recesses are formed in the shaped part 230, into each of which a fastening element 203 is inserted. The two fastening elements 203 are arranged one above the other so that the shaped part 230 can be used for high side frames. In addition, the design of the fastening element 203 with the adjustment elements 204 that are held in an adjustable manner therein is the same as in the previous embodiment examples. In the lower part of the shaped part 230 a height adjustment with the mounting part 207 and the lever 206 is shown, which can adjust the bottom relative to the shaped part 230.

Figure 22:
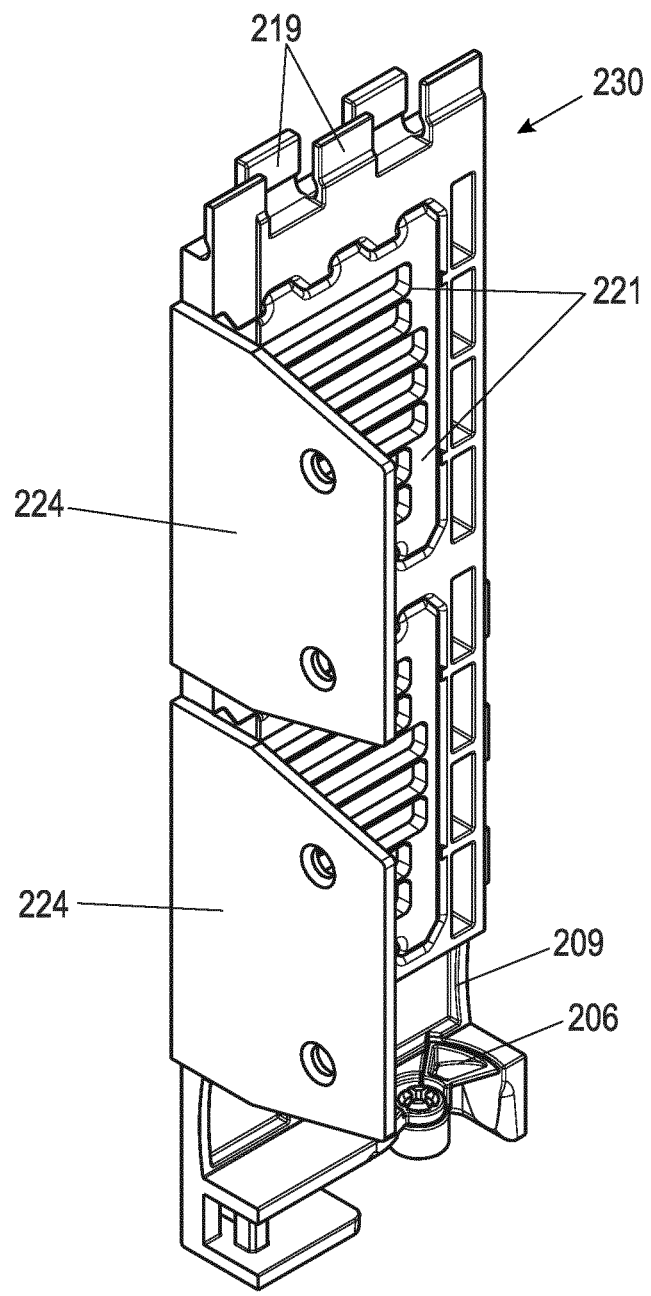
FIG. 22 shows a view of the shaped part of FIG. 21 with modified fastening elements according to the present disclosure.

In FIG. 22, the shaped part 230 is not filled with the fastening elements 203, but with modified fastening elements 221, which are fixed in a form-fitting manner to the shaped part 230. Two fastening elements 221 are provided in this case on top of each other, on which angled webs 224 are held, which serve to mount a rear wall.

Figure 23:
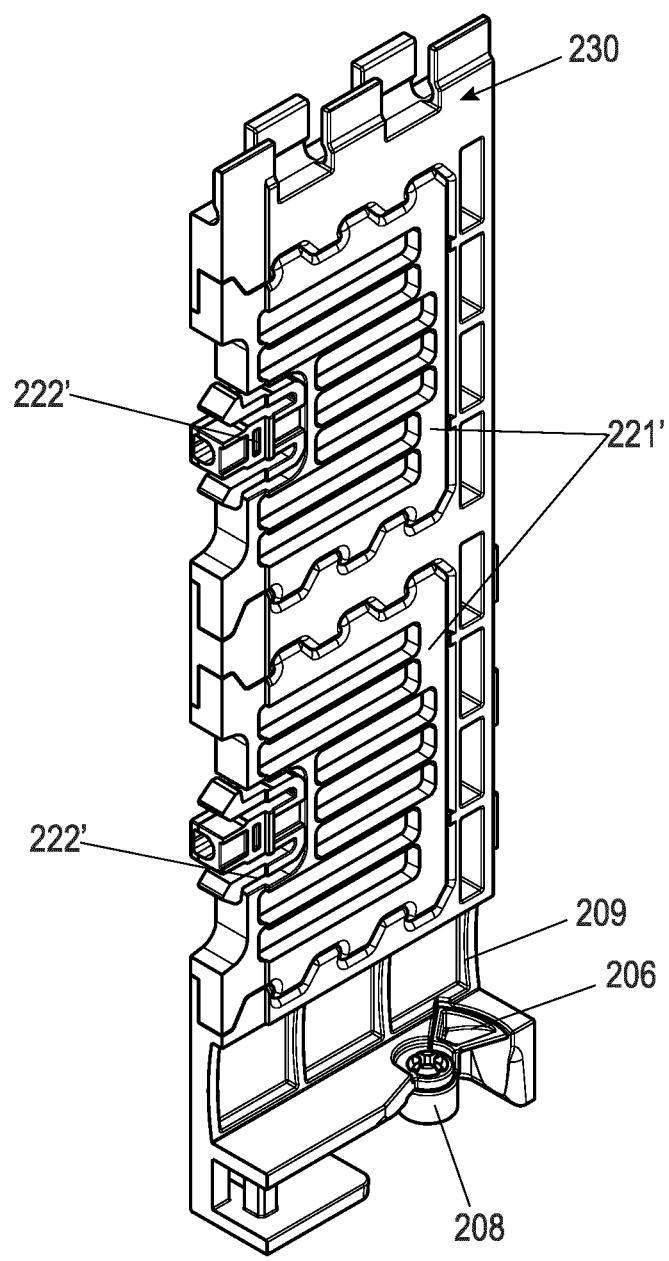
FIG. 23 shows a perspective view of the shaped part of FIG. 21 with modified fastening elements.

FIG. 23 shows the shaped part 230 with two modified fastening elements 221', in which a latching element 222' is provided instead of a pin 205 or an angled web 224 to fix a rear wall. The latching elements 222' can, for example, be inserted into an opening on a rear wall to latch the rear wall in place.

As FIGS. 21 to 23 show, one and the same shaped part 230 can be used to mount different rear panels by using different fastening means 203, 221 or 221'. The same variations can obviously also be made on the front side for fixing the front panel.

The invention claimed is:

1. A drawer having two side frames, a bottom, a rear wall and a front panel,
   wherein at least one of the side frames has a thin-walled casing which is supported by an inner core,
   wherein the inner core has at least two shaped parts which are held together in a form-fitting manner, and
   wherein the shaped parts are formed in a plate-shaped manner and have a laterally projecting web as support for the bottom.

2. A drawer according to claim 1, wherein the inner core has at least three shaped parts which are held together in a form-fitting manner.

3. A drawer according to claim 1, wherein the shaped parts extend substantially over the entire length of the casing.

4. A drawer according to claim 1, wherein a first one of the at least two shaped parts is provided with fastening means for fixing the front panel.

5. A drawer according to claim 4, wherein the fastening means has one or more protruding pins.

6. A drawer according to claim 1, wherein a second one of the at least two shaped parts comprises fastening means for the rear wall.

7. A drawer according to claim 1, wherein the shaped parts are produced as injection-molded parts.

8. A drawer according to claim 1, wherein the shaped parts can be plugged into one another via tongue-and-groove connections.

9. A drawer according to claim 1, wherein the casing is glued to the shaped parts.

10. A drawer according to claim 1, wherein the casing is formed of one or more metal sheets.

11. A drawer according to claim 10, wherein the metal sheets have a thickness of less than 0.8 mm.

12. A drawer according to claim 1, wherein a reinforcement made of a dimensionally stable material is provided in or on the shaped parts.

13. A drawer according to claim 1, wherein the side frames have a thickness of less than 10 mm.

14. A drawer according to claim 1, wherein the casing comprises at least partially decorative elements of wood.

15. A drawer according to claim 1, wherein the inner core has at least two shaped parts with different heights in the vertical direction relative to the longitudinal direction of the side frame.

16. A drawer according to claim 1, wherein a light guide or lighting means is provided on or in the shaped parts of the side frame.

17. A drawer according to claim 1, wherein a groove for receiving a bottom of the drawer is formed on at least one shaped part.

18. A drawer according to claim 17, wherein a receptacle with a claw of metallic material for fixing the bottom is provided in the groove.

19. A drawer according to claim 1, wherein a shaped part arranged at the end adjacent to the front panel or the rear wall has a receptacle into which a fastening element is inserted for fixing the front panel or the rear wall to the shaped part at the end.

20. A drawer according to claim 19, wherein the fastening element is mounted displaceably or pivotably relative to the shaped part via an adjustment mechanism.

21. A drawer according to claim 1, wherein the inner core has at least two shaped parts with different heights in the vertical direction relative to the longitudinal direction of the side frame.

22. A drawer according to claim 1, wherein a shaped part arranged at the end adjacent to the front panel or the rear wall has a receptacle into which a fastening element is inserted for fixing the front panel or the rear wall to the shaped part at the end.

23. A drawer according to claim 22, wherein the fastening element is mounted displaceably or pivotably relative to the shaped part via an adjustment mechanism.

24. A drawer having two side frames, a bottom, a rear wall and a front panel,
   wherein at least one of the side frames has a thin-walled casing which is supported by an inner core,
   wherein the inner core has at least two shaped parts which are held together in a form-fitting manner, and
   wherein a groove for receiving a bottom of the drawer is formed on at least one shaped part.

25. A drawer according to claim 24, wherein the inner core has at least three shaped parts which are held together in a form-fitting manner.

26. A drawer according to claim 24, wherein the shaped parts extend substantially over the entire length of the casing.

27. A drawer according to claim 24, wherein a first one of the at least two shaped parts is provided with fastening means for fixing the front panel.

28. A drawer according to claim 27, wherein the fastening means has one or more protruding pins.

29. A drawer according to claim 24, wherein a second one of the at least two shaped parts comprises fastening means for the rear wall.

30. A drawer according to claim 24, wherein the shaped parts are produced as injection-molded parts.

31. A drawer according to claim 24, wherein the shaped parts can be plugged into one another via tongue-and-groove connections.

32. A drawer according to claim 24, wherein the casing is glued to the shaped parts.

33. A drawer according to claim 24, wherein the shaped parts are formed in a plate-shaped manner and have a laterally projecting web as support for the bottom.

34. A drawer according to claim 24, wherein the casing is formed of one or more metal sheets.

35. A drawer according to claim 34, wherein the metal sheets have a thickness of less than 0.8 mm.

36. A drawer according to claim 24, wherein a reinforcement made of a dimensionally stable material is provided in or on the shaped parts.

37. A drawer according to claim 24, wherein the side frames have a thickness of less than 10 mm.

38. A drawer according to claim 24, wherein the casing comprises at least partially decorative elements of wood.

39. A drawer according to claim 24, wherein a light guide or lighting means is provided on or in the shaped parts of the side frame.

40. A drawer according to claim 24, wherein a receptacle with a claw of metallic material for fixing the bottom is provided in the groove.

\* \* \* \* \*